(12) United States Patent
Demirbağ

(10) Patent No.: US 9,131,209 B1
(45) Date of Patent: Sep. 8, 2015

(54) METHOD FOR AUTOMATED REALTIME CONVERSION OF 2D RGB IMAGES AND VIDEO TO RED-CYAN STEREOSCOPIC ANAGLYPH 3D

(71) Applicant: Can Demirbağ, Istanbul (TR)

(72) Inventor: Can Demirbağ, Istanbul (TR)

(*) Notice: Subject to any disclaimer, the term of this patent is extended or adjusted under 35 U.S.C. 154(b) by 0 days.

(21) Appl. No.: 14/524,964

(22) Filed: Oct. 27, 2014

(51) Int. Cl.
H04N 13/00 (2006.01)

(52) U.S. Cl.
CPC ....... *H04N 13/0007* (2013.01); *H04N 13/0025* (2013.01); *H04N 13/0037* (2013.01)

(58) Field of Classification Search
CPC .................................................. H04N 13/007
See application file for complete search history.

(56) References Cited

U.S. PATENT DOCUMENTS

| | | | |
|---|---|---|---|
| 7,773,127 B2* | 8/2010 | Zimmer et al. | 348/231.6 |
| 7,835,569 B2* | 11/2010 | Marcu | 382/162 |
| 7,893,975 B2* | 2/2011 | Zimmer et al. | 348/254 |
| 2002/0036696 A1* | 3/2002 | Takemoto | 348/223 |
| 2005/0195478 A1* | 9/2005 | Yanagawa et al. | 359/462 |
| 2006/0139461 A1* | 6/2006 | Matsui et al. | 348/231.2 |
| 2010/0171686 A1* | 7/2010 | Callegari et al. | 345/82 |

\* cited by examiner

*Primary Examiner* — Sath V Perungavoor
*Assistant Examiner* — James Pontius
(74) *Attorney, Agent, or Firm* — Bryant J. Keller; Kirton | McConkie

(57) ABSTRACT

In the 2D-to-3D conversion method presented, a series of fast-executing 2D image- or pixel-processing operations are used to transform flat 2D RGB images and video into Red-Cyan Stereoscopic 3D Anaglyph images and video. The output of this process is viewable in stereoscopic 3D on any color screen or display device, using passive red-cyan lensed Anaglyph 3D glasses. The method presented is designed to be deployed as both a hardware "2D-to-3D conversion chip", and as a short, fast, highly parallelizable realtime algorithm running on programmable graphics hardware like a GPU. The method presented upgrades 2D visual content to stereoscopic 3D, improves the lighting, contrast and color of the content, and also increases its optical sharpness by as much as 200%. Both the left-eye and right-eye image created by the method are "synthetic"—digitally generated. The method produces fairly accurate colors, despite 3D glasses with colored lenses being used.

2 Claims, 14 Drawing Sheets

METHOD FOR AUTOMATED REALTIME CONVERSION OF 2D RGB IMAGES AND VIDEO TO RED-CYAN STEREOSCOPIC ANAGLYPH 3D

TECHNICAL FIELD

The technical field of the disclosure is 2D to 3D conversion.

SUMMARY OF THE INVENTION

A short, fast, mathematically relatively simple and highly parallelizable digital method is presented that allows 2D RGB images and 2D RGB video frames to be converted to red-cyan stereoscopic Anaglyph 3D in an automated fashion, in real-time. The method analyses the shading and lighting of a 2D image or video frame, and creates a multitude of "shademaps" and "light densograms" during this analysis. "Light Densogram" creation is a novel kind of image processing operation that is unique to the 2D-to-3D method presented. Light densograms can be used to generate a depth-map for 3D conversion, to adjust the lighting and colors of an image, to sharpen or blur an image, to rapidly anti-alias a digitally sharpened image, to suppress pixel-level flickering in motion video, as well as other image, video or data processing related uses. The "shademaps" and "light densograms" created by the method presented are used to generate a "depthmap" that can be utilized to 3D convert the flat input image or video frame. An optional 3 stage optical image sharpening technique making use of neighbour-pixel sampling is used to significantly boost the optical sharpness of the input image or video frame prior to 3D conversion, resulting in a more fine-grained 3D output image. 3D conversion is achieved by shifting, scaling and deforming the input image or video frame at pixel level, using the depthmap, shademaps and light densograms created earlier to "sculpt" or "forge" an "optically correct" stereoscopic 3D image consisting of a synthetic left-eye image and a synthetic right-eye image. A number of luminance and color correction operations ensure that the stereoscopic 3D output image created by the method looks as good as possible through red-cyan lensed Anaglyph 3D glasses, with good brightness, contrast and color reproduction.

BACKGROUND

Both video and motion-picture content, and non-moving visual content like a printed magazine with colored still images, is currently sold to end consumers in one of two distinct visual formats. The dominant and older format delivers visual content to consumers as flat 2D images and video. The newer but less common format delivers images and video content to the end consumer in stereoscopic 3D. At the time this patent was written (Q2 2014), there was far more 2D content available on the global content market than 3D content. Out of thousands of video- or motion-picture titles available to purchase on High Definition Bluray discs, for example, only around 280 titles—a fairly small percentage of the total—were stereoscopic 3D titles sold as "Bluray 3D" content. The vast majority of content available to buy on DVDs and Bluray discs is presently in flat 2D. Also, virtually all video and filmed content produced before the year 2003—the year the "New 3D Cinema" paradigm first started to be experimented with—is available only in 2D form. While it is currently possible to purchase a fairly sophisticated Stereoscopic 3D capable TV set with accompanying 3D glasses for less than 1,000 Dollars, the so-called "Content Problem"—the limited availability of engaging content mastered or produced in Stereoscopic 3D—has caused the "3D Cinema At Home" market strategy of large consumer electronics manufacturers to fail in financial terms. While Stereoscopic 3D films screened at cinemas have enjoyed some popularity and financial success—2009's flagship 3D film "Avatar" used stereoscopic 3D so expertly that it quickly became the highest grossing film in history—the limited choice of engaging stereoscopic 3D content available for viewing at home has resulted in consumers buying far fewer 3D capable TVs, since their introduction, than the industry hoped and predicted would be the case. The lower-than-expected sales numbers of 3D TVs have been so disappointing to TV manufacturers that the industry, by and large, no longer promotes the 3D-viewing aspect of LCD and LED TVs actively, and also no longer charges a premium price for 3D capable TVs, as was the case when 3D TVs were first introduced. At the time of writing, the TV manufacturing industry has virtually stopped promoting 3D Television sets, and hopes, instead, that UHD ("Ultra High Definition") capable TV sets with a never-before-seen screen resolution of 4K or 8K, will sway consumers to upgrade to a new TV, instead of 3D viewing functionality being used to attract potential TV buyers. The new UHD TV sets do come with stereoscopic 3D viewing capability built-in. But the industry no longer emphasizes the Stereoscopic 3D capability in selling these next-generation TVs, arguing instead that moving Ultra High-Definition pictures at 4K or 8K resolution make for such realistic and 3 dimensional viewing in plain 2D, that stereoscopic 3D and the associated 3D glasses are no longer required to facilitate an immersive, 3 dimensional and life-like viewing experience.

One way to solve—or perhaps more accurately "alleviate"—the "3D Content Problem" is to convert visual content shot in traditional 2D to Stereoscopic 3D in a "post process conversion". This process is commonly called "2D-to-3D Conversion", "3D Conversion" or—in the case of some Hollywood movies—"Dimensionalization". 3D Conversion of 2D content can be achieved in two ways. "Manual" or "artist-driven" 3D conversion, an expensive process used mostly for high-budget content like major Hollywood movies, relies on trained human operators to tell a 3D conversion software, typically on a frame-by-frame or shot-by-shot basis, what portion of a 2D frame is at what distance and angle relative to the virtual stereoscopic 3D camera created by the 3D conversion software. Manual 3D conversion is currently a slow, labour-intensive and expensive process. The popular 1990s 2D film "Titanic", for example, was manually converted to Stereoscopic 3D over 14 months, by 450 trained 3D conversion artists working on frame-by-frame or shot-by-shot basis, with the final 3D converted version of the film costing 18 Million Dollars to complete. At the time of writing, a fully-"manual" or "semi-automatic" artist-driven 3D conversion can cost anywhere from 1,500 Dollars to 100,000 Dollars per minute of footage converted, depending on the company performing the conversion, the visual quality of the stereoscopic 3D end product achieved, and the specific 3D conversion method, process, software or technology used. The quality of 3D conversion achieved by an artist-driven process can be very good in technical and artistic terms. But the slow turn-around times and high cost of the process—several million dollars and many months of time expended to convert just one 2 hour feature film to 3D—makes it feasible to use only on select films that are popular enough for the 3D version to generate more revenue, from cinema ticket sales and Bluray 3D discs sold, than the manual 3D conversion process cost to complete. This effectively means that many 2D films that do not fall into the category "highly popular", will never get converted to 3D, or at least not until the manual 3D conversion process becomes faster and cheaper.

The second way to convert 2D content to 3D is via the use of a fully automated 2D-to-3D conversion algorithm, or a realtime 2D-to-3D conversion hardware chip. Here, no human operator is involved. Instead, an automatic 2D-to-3D algorithm or 3D conversion method applies various mathematical operations to a flat 2D video frame, in order to generate a Stereoscopic 3D version of that 2D frame. Many 3DTVs and some Bluray players and living-room media players come with some form of realtime 2D-to-3D conversion technology built in. This technology is usually implemented in the form of a fast hardware chip that converts from 2D to 3D "on the fly"—2D content is converted to stereoscopic 3D in realtime, as one is viewing the content. The quality of 3D visuals achieved by automated 2D-to-3D hardware varies by manufacturer, device, and the sophistication of the technical approach used. The current generation of automated 2D-to-3D chips and algorithms is capable of creating "watchable" 3D content from some 2D content—a film, a football match, for example, or perhaps downhill skiing, or Formula One racing. But the general consensus amongst owners of current generation 2D-to-3D conversion capable 3D TVs and Bluray and media players is that automated 2D-to-3D does not, at present, yield the kind of "sophisticated Stereo 3D effect" seen in high-budget content that was either shot in genuine stereo 3D, or shot in 2D and put through an expensive, manual, artist-driven 2D-to-3D process under the supervision of a trained Stereographer. So while 2D-to-3D conversion hardware and software is capable of creating a 3D effect from 2D footage, the 3D effect created is typically not as high quality, visually and artistically speaking, as the more sophisticated 3D effect created by either filming in genuine stereo 3D, or by post-converting via artist-driven, manual or semi-automatic 2D-to-3D conversion.

To summarize: When 2D content is to be converted to 3D, manual 2D-to-3D conversion currently yields the highest quality stereoscopic 3D, but is so labour-intensive and expensive at present that it can only be applied to a handful of films popular enough to offset the high conversion cost when screened or sold to the end user. Automatic 2D-to-3D conversion, on the other hand, is quick, inexpensive and practical, and allows any content, no matter how old or new, popular or obscure, to be viewed in stereoscopic 3D, instantly. But the quality of 3D effect generated this way cannot, at present, rival the results of an expensive, shot-by-shot, human-supervised manual 3D conversion. The owners of some manual 3D conversion companies have gone on record saying "A living, breathing, thinking human artist will always produce better Stereoscopic 3D from 2D source material than an automated algorithm or 3D conversion hardware chip can hope to achieve". While this may be somewhat true at present, there are many real-world applications where the only thing that makes sense is cheaper and faster realtime—or offline—automated 2D-to-3D conversion. Hence, R&D and development of automated 2D-to-3D conversion techniques continues at a brisk pace, with automated 3D conversion techniques becoming a little more sophisticated with each year that passes.

The 2D-to-3D conversion method presented in this patent falls into the category of automated, unsupervised, realtime capable 2D-to-3D conversion methods. It is intended to be deployed in the real world as either a dedicated realtime 2D-to-3D hardware chip, or as a realtime 2D-to-3D software algorithm running on fast graphics processing hardware like a Graphics Processing Unit (a "GPU").

BRIEF DESCRIPTION OF THE DRAWINGS

FIG. 5 is a flowchart depicting SEGMENT 3 of the 2D-to-3D method presented in this patent.

FIG. 11 is a flowchart depicting SEGMENT 9 of the 2D-to-3D method presented in this patent.

DETAILED DESCRIPTION

Figure 1:
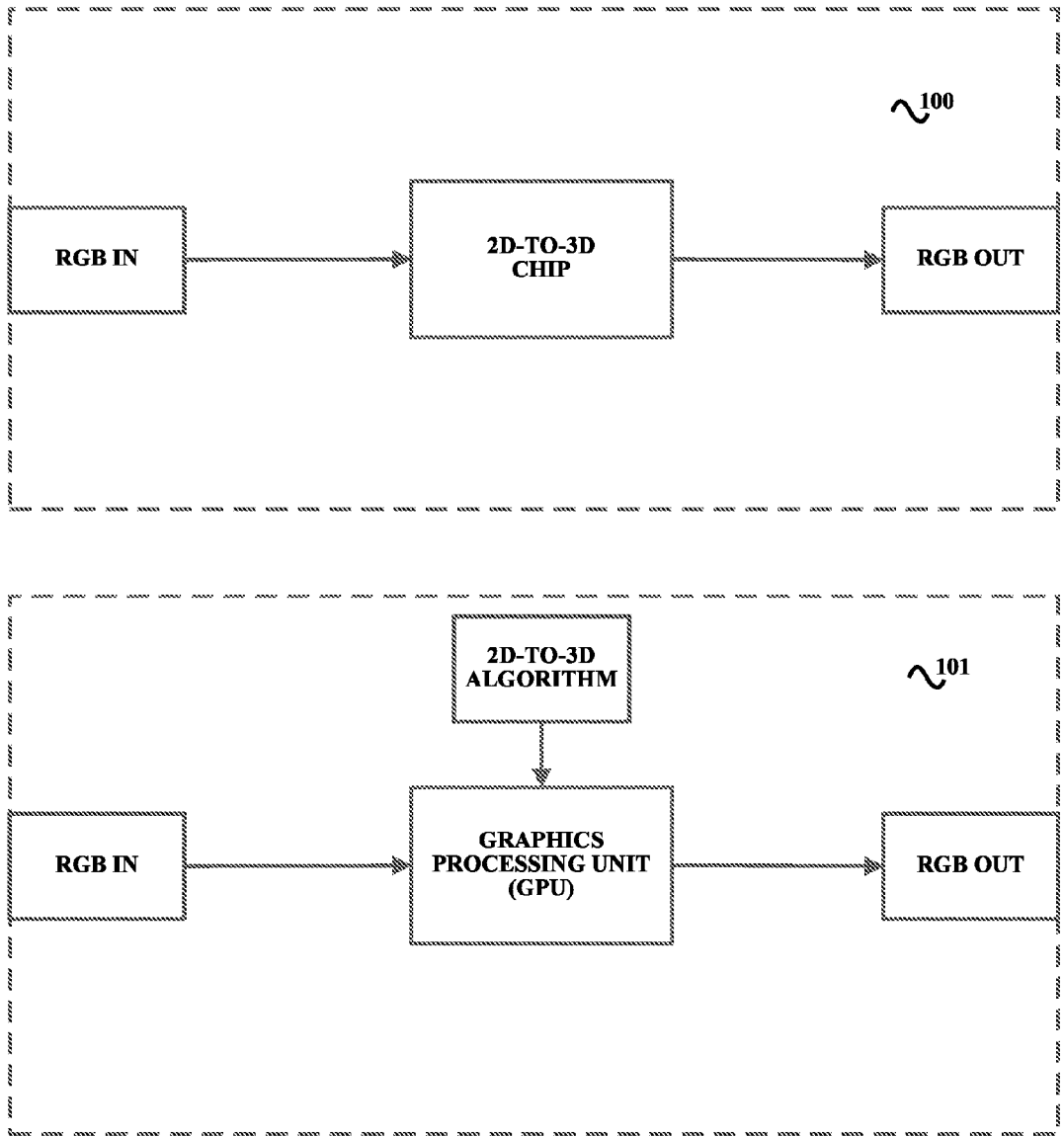
FIG. 1 is a side-by-side illustration of the 2 real world usage scenarios the 2D to 3D method presented in this patent was developed for. The top drawing (100) shows the 2D to 3D method implemented as a realtime hardware chip inside an electronic device. The bottom drawing (101) shows the 2D to 3D method running on a programmable Graphics Processing Unit (GPU) inside an electronic device as a realtime algorithm.
Figure 2:
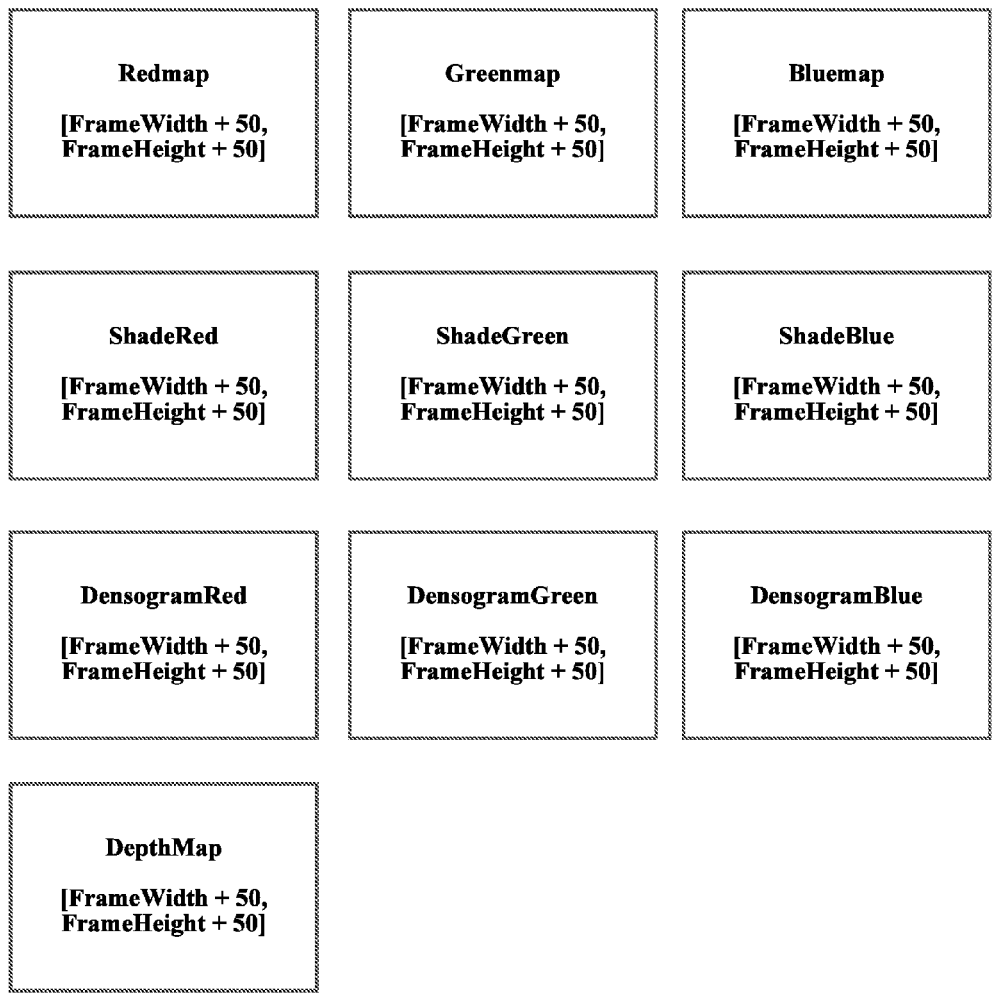
FIG. 2 (102) is an illustration of the "buffers" or "2D memory arrays" used by the 2D to 3D method. A total of 10 buffers are used:
Redmap, Greenmap, Bluemap, ShadeRed, ShadeGreen, ShadeBlue, DensogramRed, DensogramGreen, DensogramBlue and DepthMap. All buffers are the same size: FrameWidth+50 extra pixels in the x dimension, and FrameHeight+50 extra pixels in the y dimension. The 50 extra pixels added to the buffer size are used to create a 25 pixel "safe zone" of inactive pixels around the imaging data stored in the buffers; 25 pixels at the top of the frame, 25 pixels at the bottom, 25 pixels on the left side, and 25 pixels on the right side. This "safe zone" prevents the method from crashing or freezing if the method accidentally samples pixels that lie outside the area, in memory, occupied by the active image or video data processed.

The best way to introduce the 2D-to-3D conversion method presented in this patent may be to discuss briefly how other existing 2D-to-3D methods work, and in what way the novel method presented in this patent differs from these existing methods.

Many of the automated 2D-to-3D conversion methods in existence use one or more of 4 particular approaches to calculating, or generating, depth. These 4 methods are:
1) Depth from Motion
2) Depth from Focus
3) Depth from Perspective
4) Depth from Position in Frame The commonly used methods listed above typically generate a monochrome "depthmap" by examining the motion, focus and/or position and perspective present in a video frame. In addition, a function that can recognize and visually separate different objects ("object recognition") visible in a video may be used to facilitate optical separation of 3D actors, objects and backgrounds in a frame—what would be done using techniques like object-masking and rotoscoping in a manual 3D conversion. While these existing methods work reasonably well in practice—many 3DTVs and some other electronic devices use them, or derivations of them, in hardware in order to be able convert 2D content to 3D on the fly—they are computationally expensive methods, and significantly more complex, from both an algorithm-design and electronics-engineering standpoint, than the short and mathematically relatively simple 2D-to-3D method presented in this patent.

The most important difference between the 2D-to-3D method presented in this patent, and other existing 2D-to-3D methods, is that the method presented neither analyzes the motion, focus, frame-position or perspective present in an image or video, nor employs algorithmic recognition of "shapes" or "objects" present in a 2D image or video. The 2D-to-3D method presented in this patent, instead, bases its image analysis process on analysing "image shading" and "image light density", and then applies a series of short, fast 2D image-processing and floating point math steps to the 2D input content, in order to convert said input content to stereoscopic 3D, with digitally-generated—or "synthetic"—left- and right-eye images being created in the process. Perhaps most crucially, the 2D-to-3D method presented in this patent does not make use of any 3 dimensional image analysis, geometry calculations or mathematics operations in order to convert 2D content to stereoscopic 3D. Instead, a collection of relatively simple and fast-executing 2D image processing steps and floating point mathematics operations have been combined and sequenced in such a way that the overall "optical transform" resulting from the application of these 2D image-processing and mathematics steps can be relied on to create an "optically correct" or "physically correct" stereoscopic 3D version of any 2D RGB image or motion video. A significant amount of R&D, experimentation and trial-and-error carried out over almost 5 years has resulted in a sequence of fast 2D image- and video-processing steps, as well as relatively simple mathematics operations, that—combined and sequenced correctly—can reliably convert any 2D RGB image or video frame into Red-Cyan Stereoscopic Anaglyph 3D. The 2D-to-3D method resulting from this alternate approach is short, simple in structure, uses memory efficiently, is highly reliable and stable, and is, perhaps most importantly, GPU-friendly, and quite speedy in execution. The method presented in this patent is not as mathematically complex or "artificially intelligent", from a design and engineering perspective, as some existing 2D-to-3D methods are. The method presented here does not "know" or "understand", for example, what in a video frame or image constitutes a recognizable "3D object", "actor" or "image background". It also does not know at what Z-depth, distance, angle or perspective an "object" or "actor" sits in relation to the virtual 3D camera of the method. It does, however, reliably render an optically correct stereoscopic 3D scene from a 2D input scene, and does so at a high speed as a result of the computational efficiency of its 2D image-processing and floating point math based 2D-to-3D approach. Another way to explain the difference between this method and existing 2D-to-3D methods is as follows: Existing 2D-to-3D methods typically try to replicate to some extent, and automate, what a human 3D conversion artist needs to do in order to convert 2D content to Stereoscopic 3D. Motion, perspective, screen position and focus are analyzed. Recognizable objects in the 2D footage are identified and separated. Manual or semi-automated "rotoscoping", "masking" and "camera tracking" work may be required in order to—for example—separate an actor optically from a city background he or she is filmed standing against. Many existing 2D-to-3D methods try to replicate some of these manual steps, or similar operations in an automated fashion. The 2D-to-3D method presented in this patent, however, functions using a different approach altogether. Here, a sequence of interlocking 2D image- or pixel-processing functions and floating point math operations that a human operator couldn't possibly replicate by hand, are used to generate synthetic left- and right-eye images that the viewer's brain can fuse into a watchable and natural-feeling stereoscopic 3D image. While many existing 2D-to-3D methods make use of "genuine 3D analysis, genuine 3D measurements, genuine 3D calculations" to create a stereoscopic 3D output image, the 2D-to-3D method presented in this patent is based on "2D image processing" steps that nevertheless combine to "sculpt", "construct" or "forge" an optically correct 3D image of comparable visual quality to the 3D results obtained by other 2D-to-3D methods. One could say that while existing 2D-to-3D methods frequently perform "sophisticated and mathematically complex 3D analysis, measurements and calculations" to achieve their 3D conversion objective, the alternative method presented in this patent is more of "a fast, clever, 2D image-processing based optical trick" that achieves comparable 3D results, but using only short, fast-executing and highly parallelizable 2D image- and pixel-processing steps, as well as some relatively straightforward floating-point math.

The 2D-to-3D conversion method presented in this patent is intended to be used in the real world in two distinct forms:

1) A cost-effective 2D-to-3D conversion hardware chip that performs 3D conversion of 2D content on the fly.

2) A short, fast, highly parallelizable 2D-to-3D algorithm that runs in realtime on parallel-processing hardware like programmable GPUs, Co-Processor boards or FPGAs.

With these 2 guiding usage-cases in mind, the 2D-to-3D method developed had to satisfy some basic design objectives. These design objectives, briefly, were:

1) The method had to be as short, simple, fast, memory efficient and easy to understand/implement as possible. The "low design complexity" design objective makes it significantly easier and cheaper to create a realtime hardware implementation of the 2D-to-3D method presented in this patent. Low complexity and short algorithm length—the working software prototype this patent is based on is made up of only 221 lines of code—also makes the software algorithm version of the method easier to implement in a variety of real world scenarios and situations. It becomes easier to port the method to various programming languages (e.g. Assembly, C++, Verilog, CUDA, OpenCL) as well as to different computing platforms (Windows, OSX, Linux, Android, iOS) than would be the case with a larger, more complex 2D-to-3D algorithm.

2) The method had to be GPU friendly. This meant that the method had to be highly parallelizable/multithreadable, that GPU computing suitable, fast-executing floating-point math and image- and pixel-processing operations be used as much as possible, and that the method be as memory-efficient as possible, as entry-level GPUs in particular tend to come with a limited amount of Video Memory.

3) The methods 3D output had to work well with inexpensive red-cyan lensed Analgyph 3D glasses, and feature good 3D image quality when viewed through these glasses. This meant that the method must create well-lit, optically sharp 3D images with good contrast, good 3D depth, and reasonably accurate color reproduction.

4) The method had to be modular, and easily extendable and modifiable. This means that select parts of the method can be taken out and replaced with an alternate function that works differently. It also means that extra steps can be added to the method, resulting in a more nuanced 3D effect, for example, or a sharper image, or better color fidelity. This design objective is important because GPUs are getting faster and more powerful every year. Being able to extend the 2D-to-3D method easily means that the extra processing power present in new GPUs can be exploited to create an improved, more sophisticated 3D viewing experience.

5) The method had to create a 3D effect that is different, visually, from the 3D effects commonly created by existing 2D-to-3D methods. The 3D effect created by the method described in this patent is heavily based on positive parallax. The 3D image created is hologram-like, in that it "extends into the screen", rather than "popping out of the screen", without suffering the color reproduction problems and issues that laser holograms frequently suffer from. In the method presented, the entire "3D scene" created is pushed back on the Z axis and appears to float "some distance behind the screen", or appears to "genuinely extend into the far distance", in shots where the sky or far-away objects are visible for example. Physical objects—cars, actors, furniture and other objects—that sit at a particular distance to the camera in the 2D input image or video footage, genuinely appear to be at that near, medium or far distance to the camera in the 3D image created. In addition, the 2D-to-3D method makes physical objects in the 3D space created appear "volumetric"—everything depicted in 3D appears to have genuine 3D volume, as opposed to appearing like a "flat, camera-facing 2D layer situated at a certain Z-depth in 3D space"—also known in computer graphics as a "camera-facing 2D billboard".

6) The 3D output of the method had to be viewable, for extended periods of time (e.g. a 120 minute feature film), without causing problems like eye-strain, headaches, nausea, retinal rivalry and motion-sickness. The 3D output of the method presented in this patent has been tested, to date, on approximately 25 different test subjects. No test subject complained about common 3DTV-related problems like eye-strain, headaches, blurry vision, crosstalk, nausea, strobing/flickering or a "too dark" image, during the 30-45 minutes of 3D viewing they were subjected to. Many subjects described the viewing experience as being "easy on the eyes".

7) The 3D output of the 2D-to-3D method had to be deployable in as many different real-world usage scenarios as possible. To facilitate this, the method presented outputs to red-cyan Anaglyph 3D. Anaglyph 3D can be viewed on any color screen or projector. Anaglyph 3D works, with some re-calibration, in print. Anaglyph 3D can be streamed and broadcast—even using old fashioned analogue TV broadcasting and CRT TVs—just like 2D broadcast content can. Anaglyph 3D can be compressed, much like regular 2D video, and thus stored and distributed on existing, established optical media like DVDs or BluRay discs. Finally, Anaglyph 3D requires only inexpensive passive red-cyan Anaglyph 3D glasses—e.g. cardboard 3D glasses—for the stereo content generated to be viewed in true stereoscopic 3D, with good brightness, good sharpness, and good color fidelity.

A BRIEF EXPLANATION OF HOW SOME EMBODIMENTS OF THE 2D-TO-3D METHOD WORKS

The method presented creates a stereoscopic 3D Anaglyph image from 2D RGB images using the following overall technique:

1) The RGB channels of the image are separated from each other.

2) The Red channel, which is processed alone—separate from the Green and Blue channels—is seen by the right-eye of the viewer, as a result of peering through the cyan colored lens on the right side of the Anaglyph glasses. The cyan lens filters away the green and blue color channels and leaves only the red channel visible to the right eye.

3) The Green and Blue channels, which are seen by the left-eye peering through a red lens on the left side of the glasses, on the other hand, are processed together. Anything done to the Green or Blue channels is done to both channels in almost exactly the same way, as the combination of these 2 color channels forms the synthetic left-eye image seen through the Anaglyph 3D glasses. (One could say that "the Green Channel and Blue Channel travel together" throughout the 3D conversion process. What is done to one, is done to the other, too, in exactly the same way, and to almost the exact same extent. An exception to this are a few luminance- and color-correction steps that are designed to render the best possible Anaglyph 3D image, with accurate color reproduction despite 3D glasses with colored lenses being used.)

4) The positive parallax that underpins the method's basic stereoscopic "3D space" effect is created by shifting both the synthetic left-eye image and the synthetic right-eye image away from the centerpoint of the screen by a few pixels. The two digitally generated eye-images are shifted in opposite directions from each other, along the X and Y axes of the screen, to create a strong sense of 3D depth or "Z-depth" in the Anaglyph 3D output of the method. The two "shifted apart" images fuse into a single, centered-looking stereoscopic 3D image when viewed through 3D glasses. The brain of the viewer is forced, in the process, to see a stereoscopic 3D image with a fair amount of Z-depth extending "some distance into the screen". The positive parallax thus generated makes the entire 3D image appear to sit some distance behind the color screen or other display device it is viewed on. Human test subjects exposed to the method's positive parallax based stereoscopic 3D effect have likened the visual experience to "looking into a brightly lit 3D diorama" or "peering into a moving laser hologram with a fair amount of 3D depth, but with normal, natural-looking colors".

5) In addition to the basic positive-parallax based 3D effect created, a number of image processing operations are used to "sculpt" optically correct synthetic left- and right-eye images at pixel level, thus creating a more effective and more natural looking overall stereoscopic 3D effect. In both synthetic views created—the left-eye and the right-eye images are both generated by shifting, stretching and deforming the 2D input image at pixel-level—these image processing operations are used to subtly alter and re-position individual pixels in both views. The end result are digitally generated left-eye and right-eye images which the human brain accepts as a usable "stereo pair", and which the brain can fuse, with little to no conscious effort by the viewer, into a fairly natural-looking, and natural-feeling, immersive stereoscopic 3D image.

6) The fact that red-cyan Anaglyph output and RGB source images are highly compatible, from a color-reproduction standpoint, allows the method to create 3D imagery with fairly accurate color reproduction. Approximately 90% of possible RGB colors will go through this 2D-to-3D method, and the red-cyan lensed 3D glasses used for viewing, intact. The colors will appear in stereoscopic 3D very close to how they appeared in the original 2D input footage. The remaining 10% of colors—some fairly specific red- and blue-based color tones—may not go through the process completely intact, and will appear a little different, after the 3D conversion, than they did in the original 2D RGB image or video footage. For example: A bright red Ferrari sportscar filmed on a sunny day may appear somewhat dimmed and more muted in the 3D image than it did in the original 2D image.

Technical Note 1: Throughout the 2D-to-3D method presented, the Y-axis is inverted, as is usual in computer programming languages like C#. In the case of a 720×576 PAL video frame being read into the buffers of the method, for example, the [x, y] index position [0, 0] represents the top-left corner of the buffer, and index position [719+50, 575+50] the bottom-right corner of the buffer.

Technical Note 2: Each of the 9 Segments of the method presented uses a nested loop, consisting of an inner loop (index value y) and an outer loop (index value x), to scan across the video, image, shademap, densogram and depthmap buffers used by the method, top-to-bottom, left-to-right. Each of these nested loops can be "parallelized" or "multithreaded" in exactly the same way for faster computation in real world usage, particularly when used as a realtime algorithm running on a GPU, or other graphics processing hardware that employs a multitude of programmable computation cores to speed calculations up.

Technical Note 3: The method presented contains a number of "parameters" or "variable values" that can be set by the operator of the 2D-to-3D method presented in order to process images or video ranging from 400×300 pixels to—for example—1920×1080 pixels as well as possible. The parameter values shown in the flowcharts in FIGS. 3 to 11 are designed to work well when processing standard definition PAL footage—720×576 pixels at 25 frames per second. Processing images or video footage with a higher pixel resolution may require some parameters in the method presented to be set to different values than is shown in FIGS. 3 to 11.

FIG. 3, SEGMENT 1

(103) In this first segment, the "input image" or "input video frame" is read from RGB image source VideoIn.Red, VideoIn.Green and VideoIn.Blue. The RGB channels of the input image can be scaled while being read from this RGB source, for a greater 3D effect, and then color and brightness corrected, for improved viewing with colored lens anaglyph 3D glasses, before being written to image buffers Redmap, Greenmap and Bluemap, and densogram buffers DensogramRed, DensogramGreen and DensogramBlue.

(103) In the method presented, the RGB image that is 3D converted can be scaled at two different points in the algorithm. Either here, at the beginning of Segment 1, or, optionally, at the end of Segment 9. In the example presented, the scaling happens at the end of Segment 9, rather than here in Segment 1. X- and Y-axis scaling parameters xs, ys, xp, yp for the RGB input image that will be read into variables r, g and b in the next step, are thus set to 1, 1, 1 and 1 respectively—no scaling of the image happens in this Segment.

(104) The RGB input channels are read into variables r, g and b. A 25 pixel horizontal and vertical image position offset is also applied during this operation, shifting the input image 25 pixels down, and 25 pixels to the right. This creates a 25 pixel wide "border" or "safe zone" around the RGB image data now stored in variables r, g and b—25 pixels at the top of the frame, 25 pixels at the bottom of the frame, 25 pixels on the left of the frame, and 25 pixels on the right of the frame. Should any step of the 2D-to-3D process presented accidentally sample outside the working area taken up by actual RGB image data, the 25 pixel "safe zone" created around that image data will prevent the 2D-to-3D method presented from crashing, freezing, returning an error or corrupting the 3D image created.

(105) The "saturation" or "color intensity" of the Red, Green and Blue image information stored in variables r, g and b is increased. This creates better color fidelity and color reproduction when viewing the 3D output of the method with Anaglyph 3D glasses that have red and cyan colored lenses. The operation works as follows: The average luminance of the RGB values stored in variables r, g and b is calculated and stored in variable avg (which is short for "average"). The average is calculated using 31% of the value of r, 59% of the value of g, and 10% of the value of b. Next, the value of r is subtracted from the value of avg. The result is stored in variable r. The value of g is subtracted from the value of avg. The result is stored in variable g. The value of b is subtracted from the value of avg. The result is stored in variable b. Variables r, g and b now contain values that represent the "color intensity" or "saturation level" of the RGB image being processed. Now the value of r multiplied by 1.26 is subtracted from the value of avg. The result is stored in variable r. The value of g multiplied by 1.26 is subtracted from the value of avg. The result is stored in variable g. The value of b multiplied by 1.26 is subtracted from the value of avg. The result is stored in variable b. As a result of this operation, the color saturation of the RGB input image written to variables r, g and b has been increased by 26%. This value was arrived at experimentally. If the saturation is boosted by only 20%, the skintones of actors come across "pale white" when viewing through red-cyan Anaglyph glasses. If the saturation is boosted by 30%, on the other hand, the same skintones come across "too red". Faces in particular look far too red with this setting. A 26% saturation boost in this operation has been found to give the best results, in terms of skintone color reproduction in particular, as well as the reproduction of other colors, for the vast majority of input images and video footage used.

(106) The Red, Green and Blue image information stored in variables r, g and b have their luminance level adjusted. This operation, in conjunction with other image luminance adjustments yet to come, aids in creating a better-lit looking image when viewing with red-cyan lens 3D glasses that darken the image viewed slightly. The value of r is multiplied by 0.85, and has the number 15 added to it. The result is written to image buffer Redmap at index position [x, y]. The value of g is multiplied by 0.85, and has the number 15 added to it. The result is written to image buffer Greenmap at index position [x, y]. The value of b is multiplied by 0.85, and has the number 15 added to it. The result is written to image buffer Bluemap at index position [x, y].

(106) The saturation and brightness adjusted RGB image data now stored in image buffers Redmap, Greenmap and Bluemap at index position [x, y] is also copied to densogram buffers DensogramRed, DensogramGreen and DensogramBlue at index position [x, y].

FIG. 4, SEGMENT 2

This operation creates RGB "Light Densograms" that will be stored in densogram buffers DensogramRed, DensogramGreen and DensogramBlue. A "Light Densogram" is a mathematical map of the "light density" in an image. Light Densograms can be used for many different useful operations, from relighting an image, to manipulating image color, sharpness and contrast, to creating a 3D depthmap for 2D-to-3D conversion, to anti-aliasing an image and suppressing flickering in motion video (How this works in practice will be shown in FIG. 7, FIG. 9 and FIG. 11).

(107) The image data stored in densogram buffers DensogramRed, DensogramGreen and DensogramBlue at index position [x, y], multiplied by 1, is written to variables r, g and b. The image data in densogram buffers DensogramRed, DensogramGreen and DensogramBlue that is 1 pixel to the right—at index position [x+1, y]—of aforementioned data is stored in variables rt, gt and bt. Now, the value of variable r multiplied with 1.2 is subtracted from the value of variable rt. The result is written to variable r. The value of variable g multiplied with 1.2 is subtracted from the value of variable gt. The result is written to variable g. The value of variable b multiplied with 1.2 is subtracted from the value of variable bt. The result is written to variable b. Now the average luminance of the image data stored in variables r, g and b is calculated using 31% of the value of r, 59% of the value of g, and 11% of the value of b. The result of this operation is stored in variable avg (shorthand for "average").

(108) Any values of variables r, g and b that are negative—smaller than 0—are set to 0.

(109) The variable DensogramMultiplier is set to value 1. Now, the value of densogram buffer DensogramRed at index position [x+1, y] is set to the value of DensogramRed[x+1, y], plus the value of variable r multiplied by the value of DensogramMultiplier. The value of densogram buffer DensogramGreen at index position [x+1, y] is set to the value of DensogramGreen[x+1, y], plus the value of variable g multiplied by the value of DensogramMultiplier. The value of densogram buffer DensogramBlue at index position [x+1, y] is set to the value of DensogramBlue[x+1, y], plus the value of variable b multiplied by the value of DensogramMultiplier.

Figure 3:
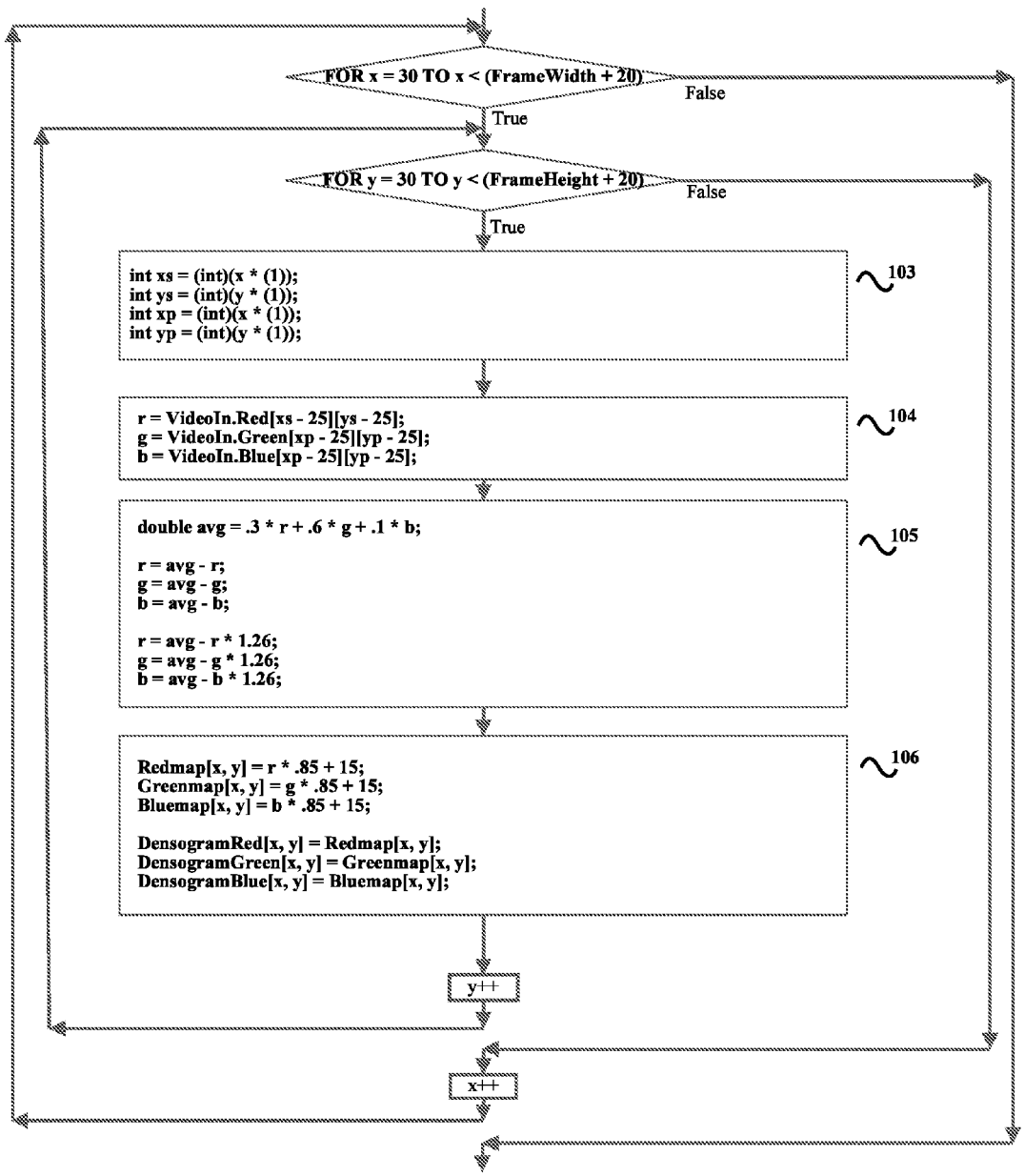
FIG. 3 is a flowchart depicting SEGMENT 1 of the 2D-to-3D method presented in this patent.
Figure 4:
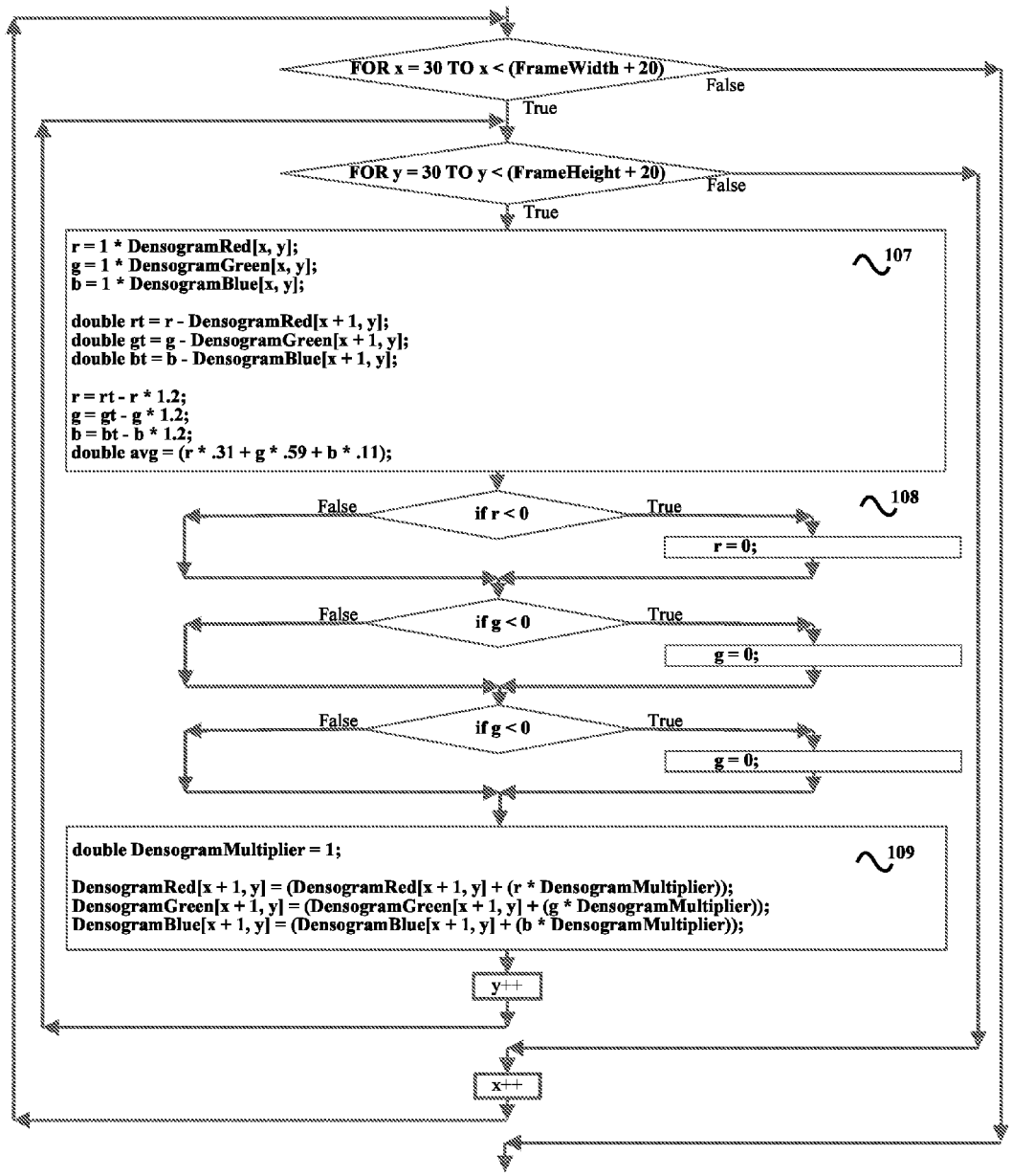
FIG. 4 is a flowchart depicting SEGMENT 2 of the 2D-to-3D method presented in this patent.
Figure 5A:
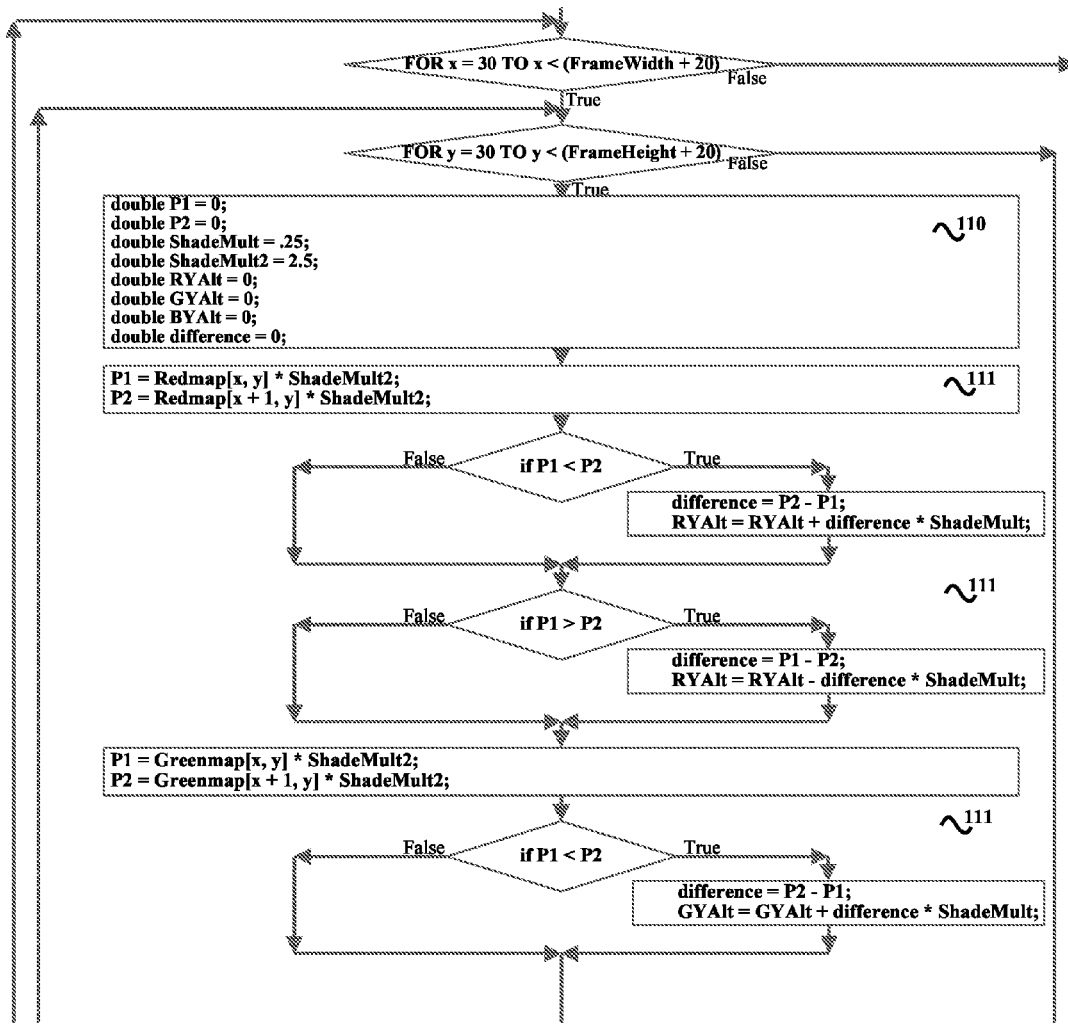
FIG. 5A and FIG. 5B together comprise FIG. 5.
Figure 5B:
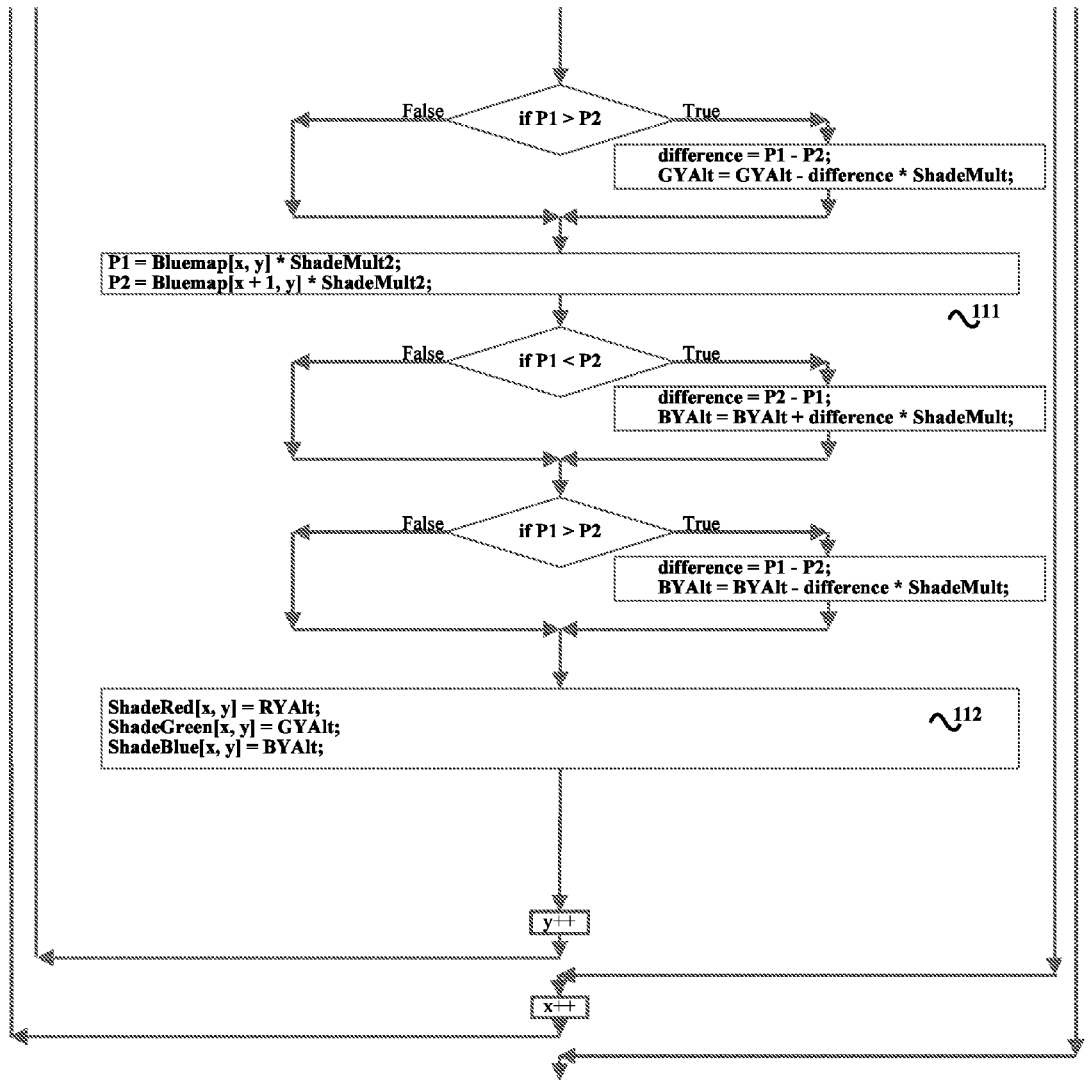

The densogram buffers DensogramRed, DensogramGreen and DensogramBlue now contain a red, green or blue "Light Densogram" generated from the red, green and blue channels of the RGB input image read into the method in FIG. 3.

FIG. 5, SEGMENT 3

A "Shademap" operation is carried out on each of the image buffers Redmap, Greenmap and Bluemap.

This operation measures the difference in RGB luminance values, and thus "shading", between the current pixel, and its nearest neighbour to the right of this original pixel.

The result of the operation is stored in shademap buffers ShadeRed, ShadeGreen and ShadeBlue.

(110) A number of variables are declared to allow the Shademap operation to take place. The variables P1, P2, RYAlt, GYAlt, BYAlt and difference are set to 0. Variables ShadeMult and ShadeMult2 are set to 0.25 and 2.5 respectively.

(111) The value of Redmap[x, y] multiplied with the value of ShadeMult2 is written to variable P1. The value of Redmap [x+1, y] multiplied with the value of ShadeMult2 is written to variable P2.

(111) If the value of P1 is smaller than the value of P2, the following occurs: The value of P1 is subtracted from the value of P2. The result is stored in variable difference. The value of variable difference multiplied by the value of ShadeMult is added to the value of variable RYAlt. The result is stored in variable RYAlt.

(111) If, on the other hand, the value of P1 is larger than the value of P2, the following occurs: The value of P2 is subtracted from the value of P1. The result is stored in variable difference. The value of difference multiplied by the value of ShadeMult is subtracted from the value of RYAlt. The result is stored in variable RYAlt.

(111) The same procedure that was carried out with buffer Redmap, resulting in the numeric shademap value stored in variable RYAlt, is now repeated for the image data stored in buffers Greenmap and Bluemap, resulting in the numeric shademap values stored in variables GYAlt and BYAlt.

(112) The value of variable RYAlt is written to shademap buffer ShadeRed at index position [x, y]. The value of variable GYAlt is written to shademap buffer ShadeGreen at index position [x, y]. The value of variable BYAlt is written to shademap buffer ShadeBlue at index position [x, y].

Shademap buffers ShadeRed, ShadeGreen and ShadeBlue now contain red, green and blue shademaps derived from the red, green and blue image data stored in image buffers Redmap, Greenmap and Bluemap.

Figure 6A:
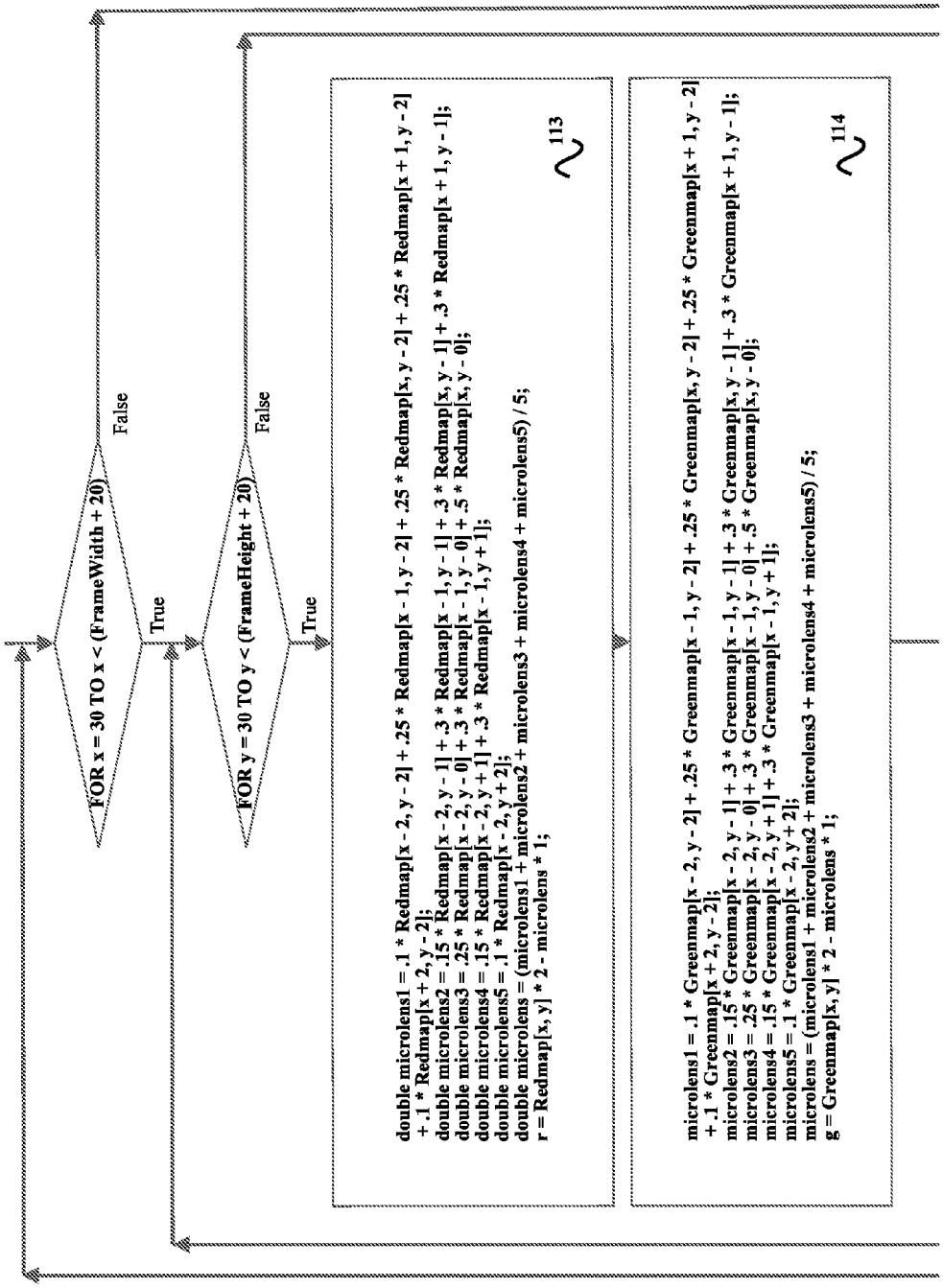
FIGS. 6A and 6B contain a flowchart depicting SEGMENT 4 of the 2D-to-3D method presented in this patent.
Figure 6B:
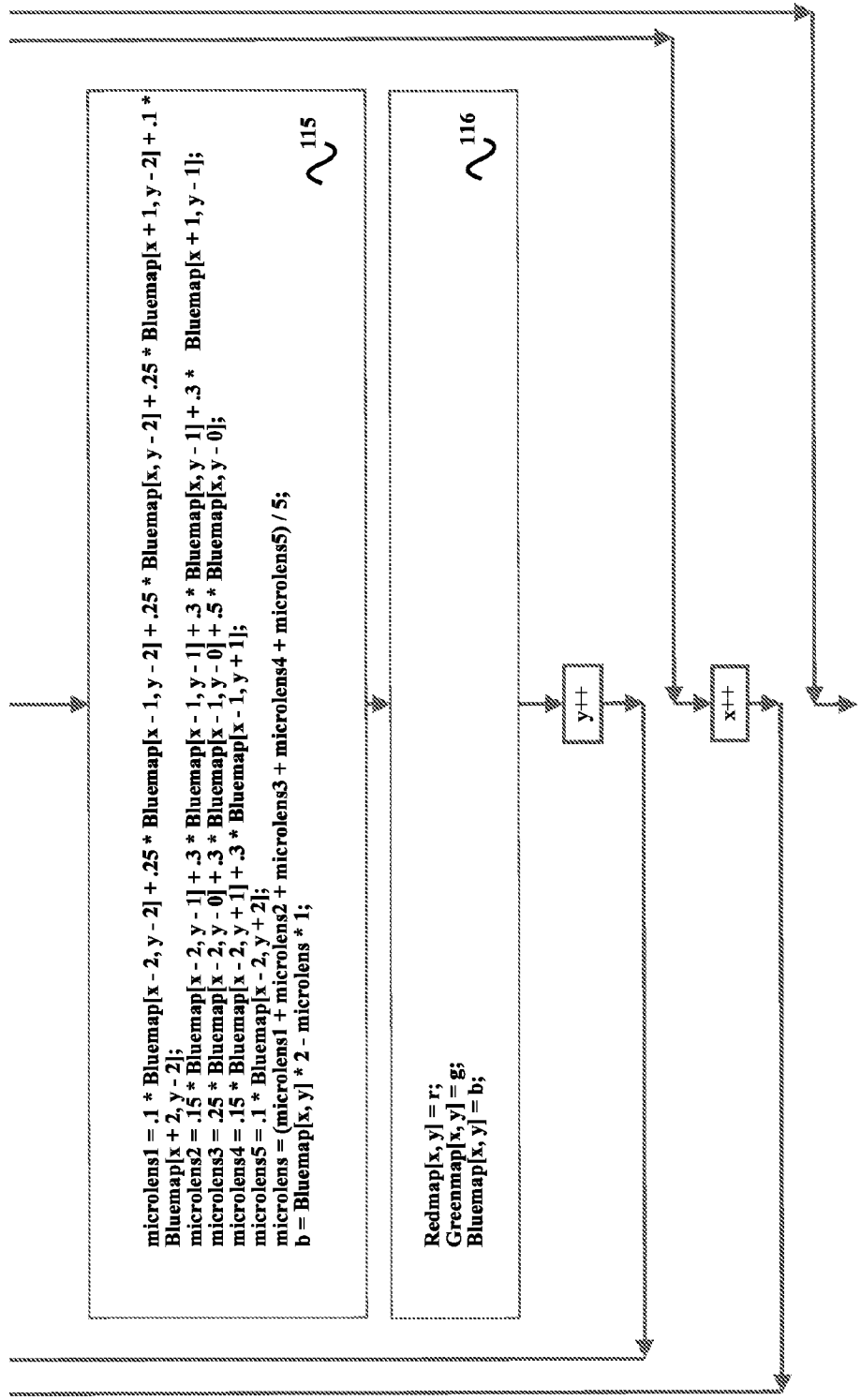
Figure 7:
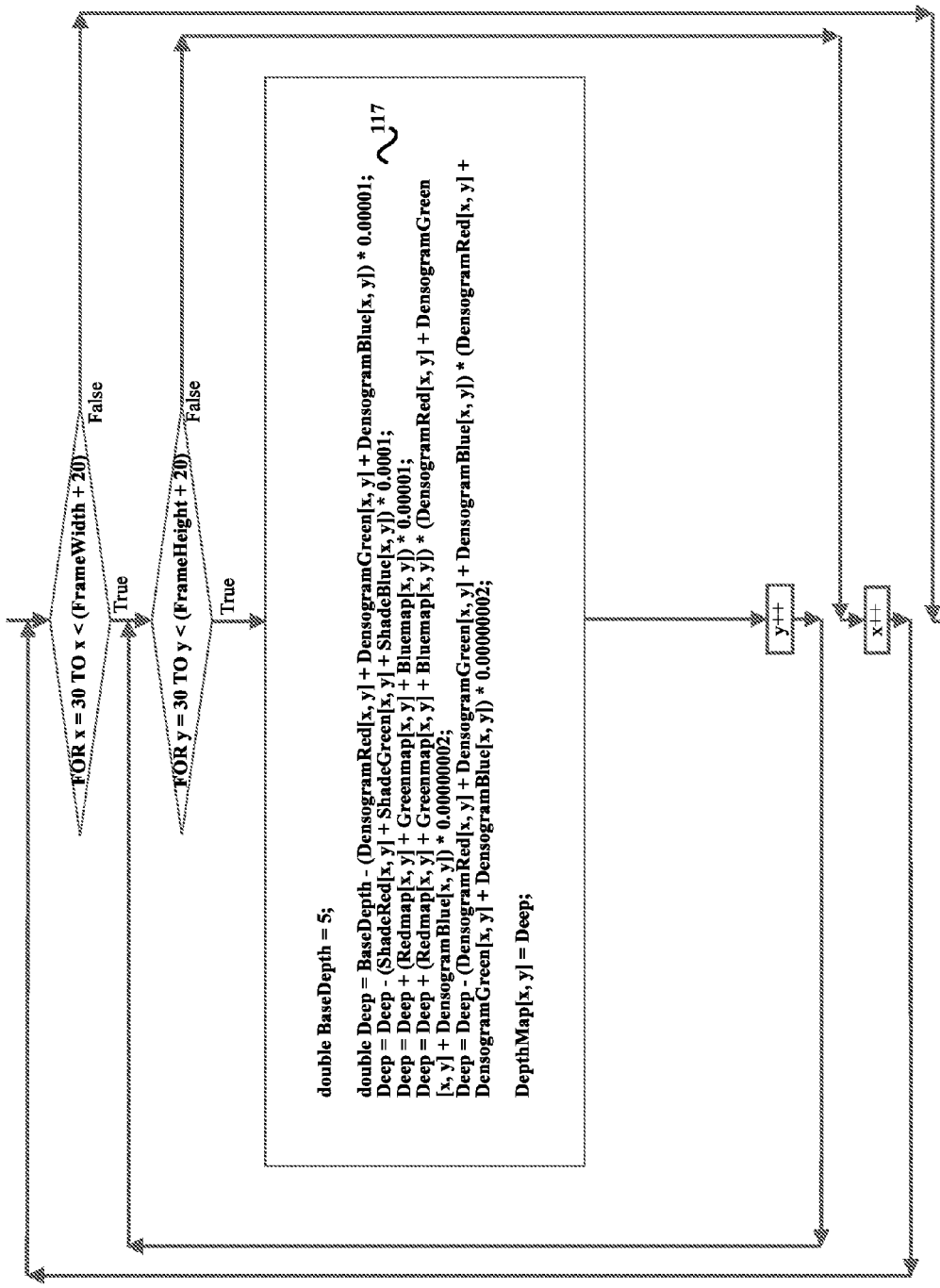
FIG. 7 is a flowchart depicting SEGMENT 5 of the 2D-to-3D method presented in this patent.

FIGS. 6A and 6B, SEGMENT 4

This optional step deblurs and sharpens the image data stored in image buffers Redmap, Greenmap and Bluemap. This is necessary only when the input image is not particularly sharp—because it is compressed with a lossy image or video compression scheme like JPEG or MPEG2 for example. In general, the sharper the output image is, the better the 3D effect of 3D converted material comes across.

The method used to deblur and sharpen the image data here is conceptually quite similar to an "unsharp mask" operation. First, 15 pixels in a 5×5 pixel area around a center pixel are sampled, with pixel value weighting that, roughly, mimics the shape of a small, round "microlens" hovering above the pixels. The weights used for the sampled neighbour pixels are 0.10, 0.15, 0.25, 0.30 or 0.50. Then, the blurry image data thus created is subtracted from the input image, multiplied by a factor of 2. The result is an output image that is visibly sharper, and considerably less blurry, than the original RGB input image of video frame was.

(113) Variables microlens1, microlens2, microlens3, microlens4, and microlens5 are filled with pixel luminance data sampled from 15 pixels situated in a 5×5 pixel area, and weighted by 0.10, 0.15, 0.25, 0.30 or 0.50. The average of these microlens variables is now calculated by adding the values stored in variables microlens1, microlens2, microlens3, microlens4 and microlens5 together, and dividing the resulting total by 5. The average thus calculated is stored in variable microlens. Now the value of microlens multiplied by 1 is subtracted from the value of buffer Redmap [x, y] multiplied by 2. The value resulting from this operation is written to variable r.

(114) and (115) The same "optical sharpening" operation carried out on the red image buffer Redmap in step (113) is now applied to the green and blue image buffers Greenmap and Bluemap. The values resulting from these operations are stored in variables g and b.

(116) The values stored in variables r, g and b are now written to RGB image buffers Redmap, Greenmap and Bluemap at index position [x, y]. The RGB image data stored in buffers Redmap, Greenmap and Bluemap is now significantly less blurry, and significantly optically sharper, than was the case before this Segment.

FIG. 7, SEGMENT 5

The operations in this segment create the basic depthmap, which, in operations to follow, will be used to convert the 2D input image or video frame to stereoscopic 3D.

(117) The value of the variable BaseDepth is set to 5. Next, the sum of the values stored in densogram buffers DensogramRed, DensogramGreen and DensogramBlue at index position [x, y], multiplied by 0.00001, is subtracted from the value of variable BaseDepth. The result of this operation is stored in variable Deep. Now the sum of the values stored in shademap buffers ShadeRed, ShadeGreen and ShadeBlue at index position [x, y], multiplied by 0.0001, is subtracted from the value of variable Deep. The result of this operation is stored in variable Deep. Next, the sum of the values stored in image buffers Redmap, Greenmap and Bluemap at index position [x, y], multiplied by 0.00001, is added to the value of variable Deep. The result of this operation is stored in variable Deep. Next, the sum of the values of image buffers Redmap, Greenmap and Bluemap at index position [x, y] is multiplied by the sum of the values of the densogram buffers DensogramRed, DensogramGreen, DensogramBlue at index position [x, y], and the multiple of these sums, in turn, is multiplied by the value 0.00000002. The result of this multiplication is added to the value of Deep. The end result of this operation, in turn, is written to variable Deep. Now the sum of the values stored in densogram buffers DensogramRed, DensogramGreen, DensogramBlue at index position [x, y] is squared—the sum of the 3 buffers is multiplied by the sum of the 3 buffers in other words—and the resulting square of these values is multiplied by the value 0.00000002. The result of this operation is subtracted from the value of Deep. The end result of this subtraction is stored in variable Deep. The final step in this segment is that the value of variable Deep is written to the depthmap buffer DepthMap at index position [x, y].

FIG. 8, SEGMENT 6

Figure 8:
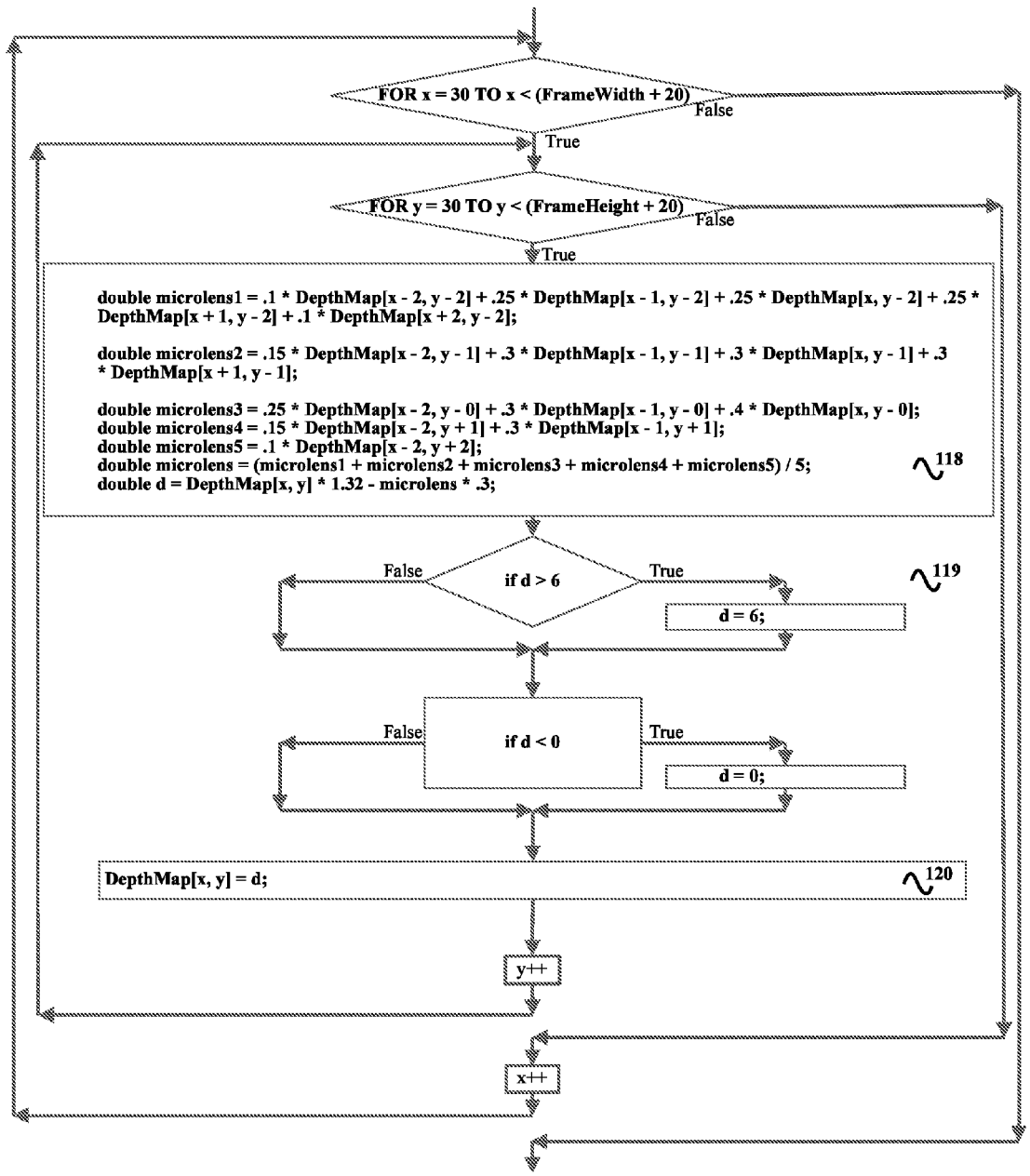
FIG. 8 is a flowchart depicting SEGMENT 6 of the 2D-to-3D method presented in this patent.
Figure 9:
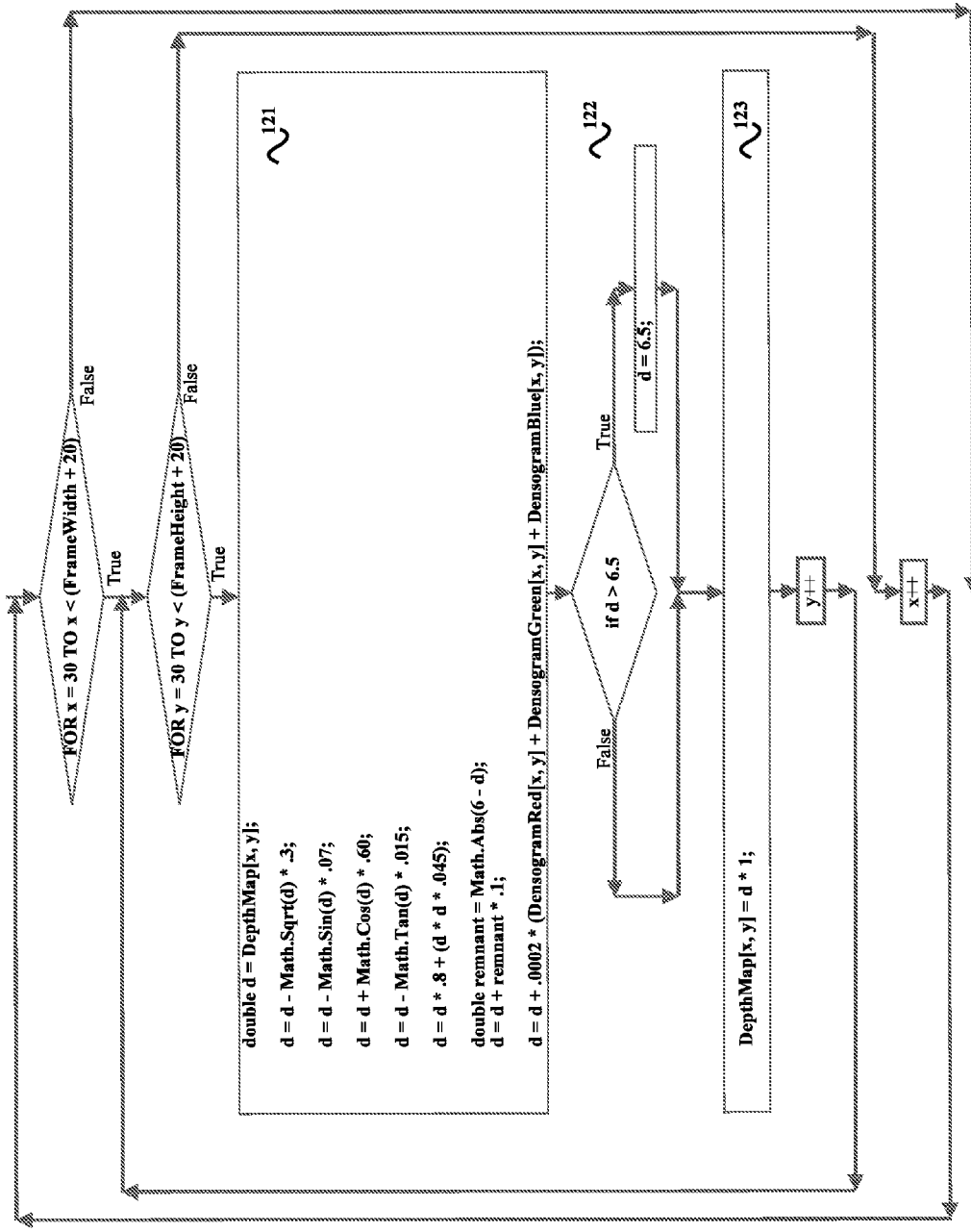
FIG. 9 is a flowchart depicting SEGMENT 7 of the 2D-to-3D method presented in this patent.
Figure 10:
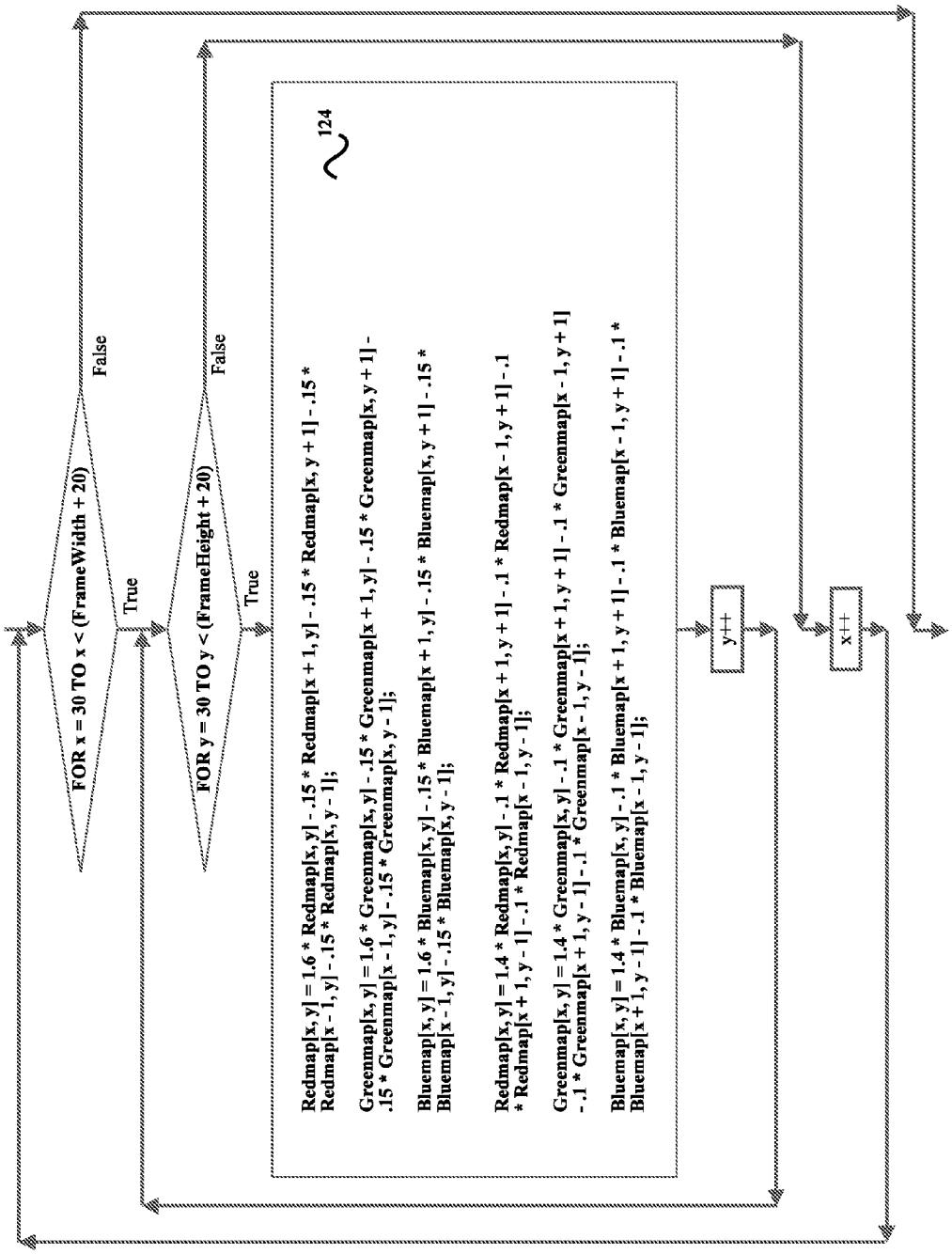
FIG. 10 is a flowchart depicting SEGMENT 8 of the 2D-to-3D method presented in this patent.

FIG. 8 shows a deblurring and sharpening operation that is almost identical in functionality to the deblurring and sharpening operation shown previously in FIGS. 6A and 6B. This time, however, the newly created depth buffer DepthMap is sharpened. This operation aids in creating a final 3D effect that is "fine-grained" and "optically sharp", rather than "blobby" or "blurry" looking.

(118) Variables microlens1, microlens2, microlens3, microlens4, and microlens5 are filled with depthmap data sampled from 15 cells, situated in a 5×5 cell area, of values stored in depth buffer DepthMap. These cell values are weighted, or multiplied, by weights 0.1, 0.15, 0.25, 0.30 or 0.40. The average of these values is now calculated by adding the values stored in variables microlens1, microlens2, microlens3, microlens4 and microlens5 together, and dividing the resulting total by 5. The resulting "blurry" average is stored in variable microlens. Now the value of microlens multiplied by 0.3 is subtracted from the value of depthmap buffer DepthMap at index position [x, y] multiplied by the value 1.32. The final value resulting from this operation is written to variable d.

(119) If the value of variable d is larger than 6, the value of d is set to 6. If the value of variable d is smaller than 0, the value of d is set to 0.

(120) The value of variable d is written to depth buffer DepthMap at index position [x, y].

FIG. 9, SEGMENT 7

Figure 11A:
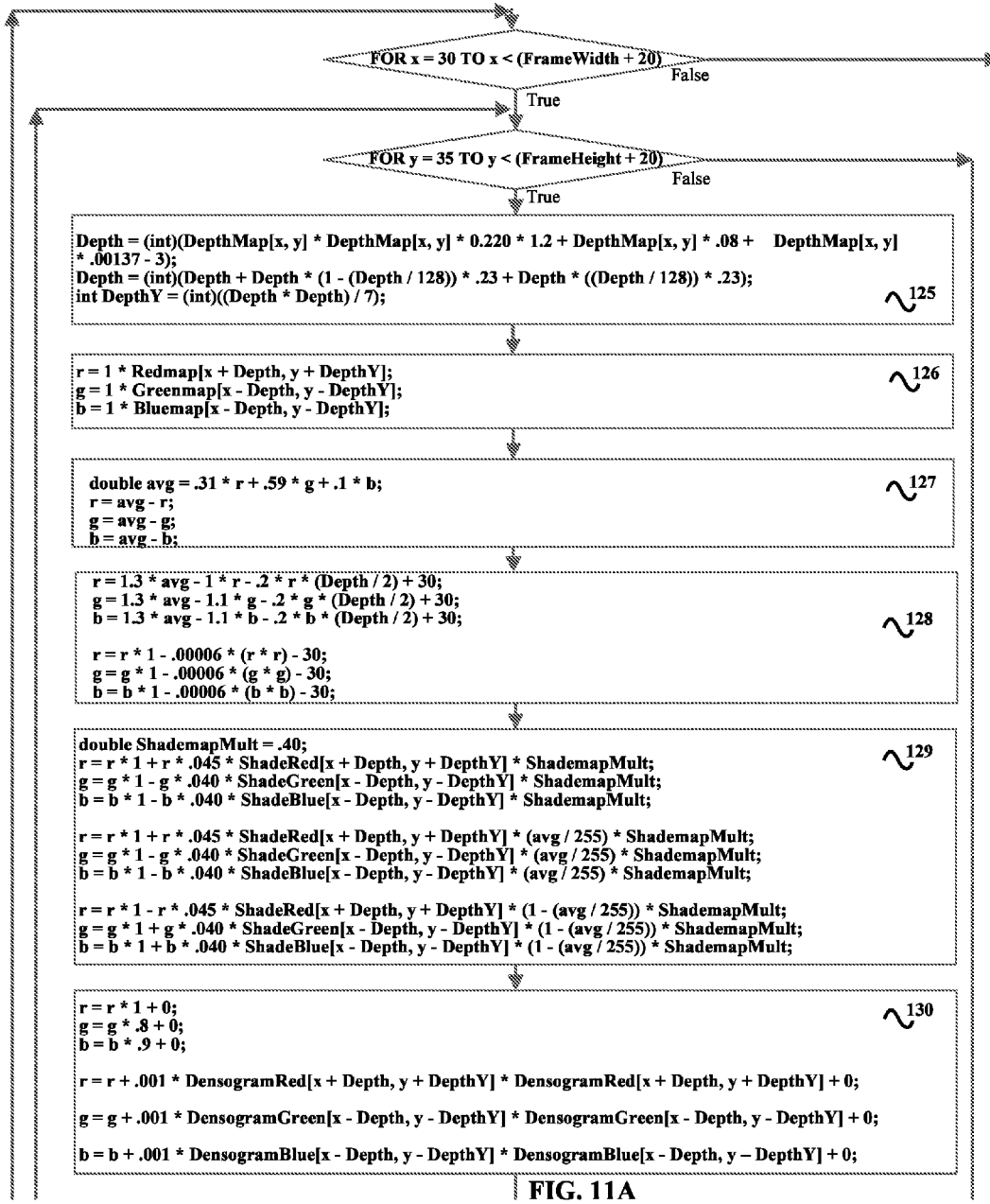
FIG. 11A and FIG. 11B together comprise FIG. 11.
Figure 11B:
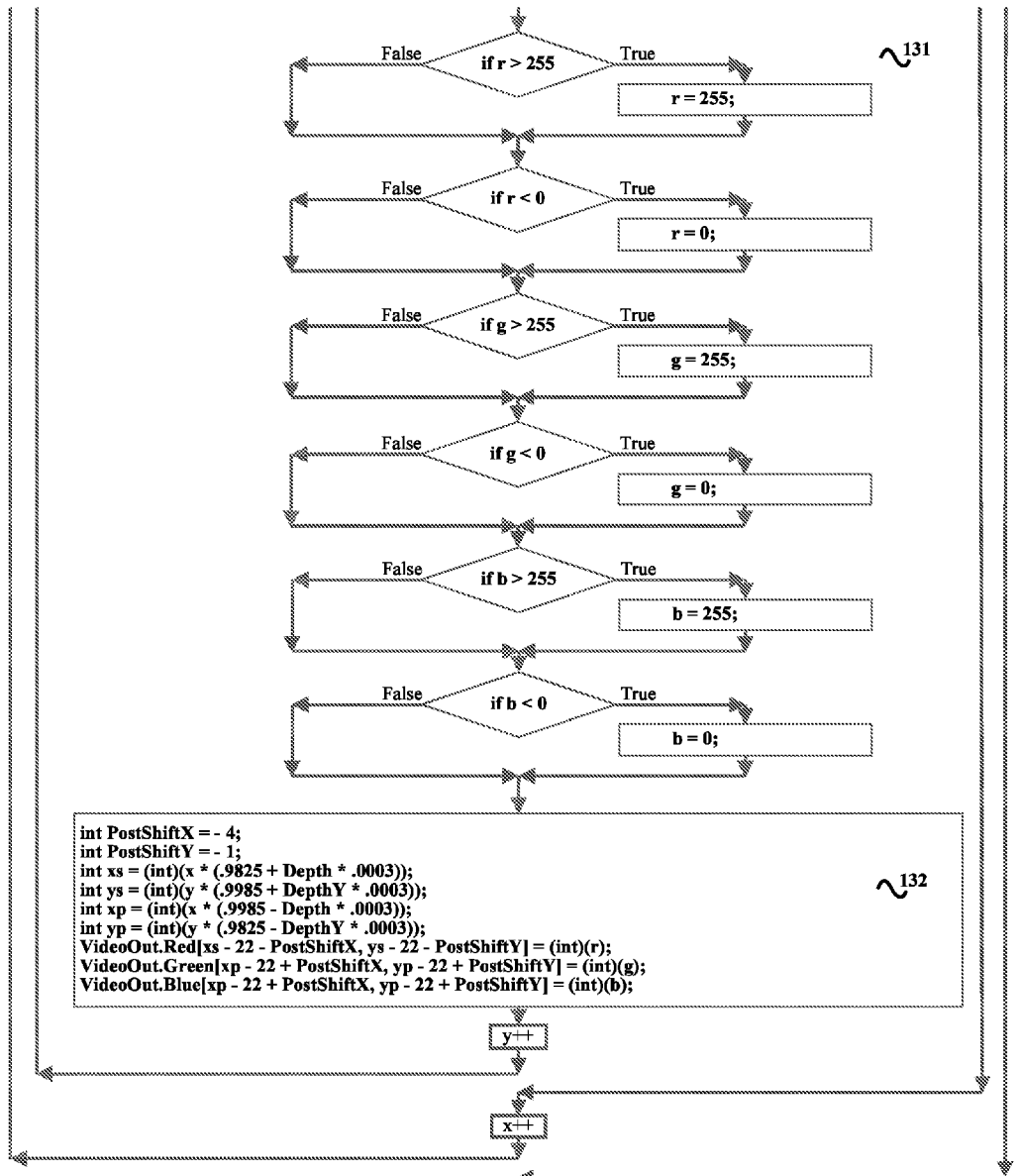

In this segment, a series of mathematical operations are applied to the values of depth buffer DepthMap in order to create a depthmap that creates the best possible 3D effect when it is used to "3D convert" the input image or video frames in FIG. 11, SEGMENT 9, the final segment of the 2D-to-3D method presented in this patent.

(121) First, the numerical value of depth buffer DepthMap at index position [x, y] is written to variable d. Next, the square root of the value of variable d, multiplied by 0.3, is subtracted from the value of variable d. The result of this operation is written to variable d. Next, the sine of the value of variable d, multiplied by 0.07, is subtracted from the value of variable d. The result of this operation is written to variable d. Next, the cosine of the value of variable d, multiplied by 0.60, is added to the value of variable d. The result of this operation is written to variable d. Next, the tangent of the value of variable d, multiplied by 0.015, is subtracted from the value of variable d. The result of this operation is written to variable d. Next, the value of variable d is multiplied by 0.8, and the square of the value of variable d, multiplied by 0.045, is added to this multiple. The result of this operation is written to variable d. Next, the mathematical absolute of the number 6 minus the value of variable d is calculated. The result of this operation is stored in variable remnant. Now the value of variable remnant, multiplied by 0.1, is added to the value of variable d. The result of this operation is written to variable d. Next, the sum of densogram buffers DensogramRed, DensogramGreen and DensogramBlue at index position [x, y], multiplied by 0.0002, is added to the value of variable d. The result of this operation is written to variable d.

(122) If the value of variable d is larger than 6.5, the value of variable d is set to 6.5.

(123) The value of variable d, multiplied by 1, is written to depthmap buffer DepthMap at index position [x, y].

FIG. 10, SEGMENT 8

In this optional segment, image buffers Redmap, Greenmap and Bluemap are sharpened further using a neighbour-pixels operation that is similar to "unsharp masking". Unlike the sharpening operation shown in FIGS. 6A and 6B, only 8 pixels in a 3×3 pixel area are sampled in this step. This operation contributes significantly to achieving a "super-sharp" level of optical sharpness in the final stereoscopic 3D output of the 2D-to-3D conversion method presented. This operation is only needed for input images or video frames that are not as sharp as is needed to create a good stereoscopic 3D effect.

(124) The pixel values of image buffer Redmap at index positions [x+1, y], [x, y+1], [x−1, y], [x, y−1], each multiplied by weight 0.15, are subtracted from the value of image buffer Redmap at index position [x, y] multiplied by 1.6. The result of this operation is written to image buffer Redmap at index position [x, y]. Next, the pixel values of image buffer Greenmap at index positions [x+1, y], [x, y+1], [x−1, y], [x, y−1], each multiplied by weight 0.15, are subtracted from the value of image buffer Greenmap at index position [x, y] multiplied by 1.6. The result of this operation is written to image buffer Greenmap at index position [x, y]. Next, the pixel values of image buffer Bluemap at index positions [x+1, y], [x, y+1], [x−1, y], [x, y−1], each multiplied by weight 0.15, are subtracted from the value of image buffer Bluemap at index position [x, y] multiplied by 1.6. The result of this operation is written to image buffer Bluemap at index position [x, y]. In the second half of SEGMENT 8, the pixel values of image buffer Redmap at index positions [x+1, y+1], [x−1, y+1], [x+1, y−1], [x−1, y−1], each multiplied by weight 0.1, are subtracted from the value of image buffer Redmap at index position [x, y] multiplied by 1.4. The result of this operation is written to image buffer Redmap at index position [x, y]. Next, the pixel values of image buffer Greenmap at index positions [x+1, y+1], [x−1, y+1], [x+1, y−1], [x−1, y−1], each multiplied by weight 0.1, are subtracted from the value of image buffer Greenmap at index position [x, y] multiplied by 1.4. The result of this operation is written to image buffer Greenmap at index position [x, y]. Next, the pixel values of image buffer Bluemap at index positions [x+1, y+1], [x−1, y+1], [x+1, y−1], [x−1, y−1], each multiplied by weight 0.1, are subtracted from the value of image buffer Bluemap at index position [x, y] multiplied by 1.4. The result of this operation is written to image buffer Bluemap at index position [x, y].

The image buffers Redmap, Greenmap and Bluemap now store an RGB image or video frame that is much sharper than the original input image or video frame.

FIG. 11, SEGMENT 9

In this final segment of the algorithm, the actual 2D-to-3D conversion takes place. The shademap buffers are applied to the image, the 3D image is relit and anti-aliased using the densogram buffers, the image is shifted, scaled and deformed, and the final red-cyan stereoscopic 3D output image is created and written to VideoOut.Red, VideoOut.Green and VideoOut.Blue.

(125) The square of the value of depth buffer DepthMap at index position [x, y] is multiplied by 0.220, and then by 1.2. Next, the value of depth buffer DepthMap at index position [x, y] multiplied by 0.08 is added to this result. The value of depth buffer DepthMap at index position [x, y] multiplied by 0.00137 is then added to this new result. The number 3 is then subtracted from this result. The final result now created is converted to an integer. This integer is written to the variable Depth. Next, the result of the value of Depth multiplied by 1 minus (the value of Depth divided by 128), multiplied by 0.23, is added to the value of Depth. Also, the result of the value of Depth multiplied by (the value of Depth divided by 128), multiplied by 0.23, is added to the value of Depth. The resulting number is converted to an integer. This integer is written to variable Depth. Next, the Y-axis equivalent of variable Depth is created. This variable is called DepthY. The square of the value of Depth is divided by 7. The result of this operation is converted to an integer. The value of this integer is written to variable DepthY.

(126) The numerical value stored in image buffer Redmap at index position [x+Depth, y+DepthY] is multiplied by 1. The result is written to variable r. The numerical value stored in image buffer Greenmap at index position [x−Depth, y−DepthY] is multiplied by 1. The result is written to variable g. The numerical value stored in image buffer Bluemap at index position [x−Depth, y−DepthY] is multiplied by 1. The result is written to variable b. Note: The Depth and DepthY offset values used for r, and those for g and b, in this operation, are opposites. Variable r derives its value from positive offsets Depth and DepthY, while variables g and b derive their values from negative offsets Depth and DepthY.

(127) The average luminance of the RGB values stored in variables r, g and b is calculated and stored in variable avg. The average is calculated using 31% of the value of r, 59% of the value of g, and 10% of the value of b. Now the value of r is subtracted from the value of avg. The result is stored in variable r. The value of g is subtracted from the value of avg. The result is stored in variable g. The value of b is subtracted from the value of avg. The result is stored in variable b. Variables r, g and b now contain values that represent the "color intensity" or "saturation level" of the RGB channels being processed.

(128) The value of avg is multiplied by 1.3. The value of r multiplied by 1 is subtracted from the result of this operation. Now the value of r multiplied by 0.2, multiplied by (the value of Depth divided by 2) is subtracted from this new result. Finally, the number 30 is added to the grand total. The result of all these operations is written to variable r. This operation is now repeated in a similar fashion for color channels green and blue: The value of avg is multiplied by 1.3. The value of g multiplied by 1.1 is subtracted from the result of this operation. Now the value of g multiplied by 0.2, multiplied by (the value of Depth divided by 2) is subtracted from this result. Finally the number 30 is added to the grand total. The result of all these operations is written to variable g. Next, the value of avg is multiplied by 1.3. The value of b multiplied by 1.1 is subtracted from the result of this operation. Now the value of b multiplied by 0.2, multiplied by (the value of Depth divided by 2) is subtracted from this result. Finally the number 30 is added to the grand total. The result of all these operations is written to variable b.

(128) The value of r is multiplied by 1. The square of the value of r multiplied by 0.00006 is subtracted from this new result. The number 30 is subtracted from this new result. The result of these operations is written to variable r. The same operation is now applied to color channels green and blue: The value of g is multiplied by 1. The square of the value of g multiplied by 0.00006 is subtracted from this result. The number 30 is subtracted from this new result. The result of these operations is written to variable g. The value of b is multiplied by 1. The square of the value of b multiplied by 0.00006 is subtracted from this result. The number 30 is subtracted from this new result. The result of these operations is written to variable b.

(129) This operation uses the shademap buffers ShadeRed, ShadeGreen and ShadeBlue, which are added to and subtracted from the values of r, g and b in various ways, to create a stereoscopic 3D effect with greater intensity and greater sense of 3D volume. A side effect of this operation is that the final 3D image created looks sharper, and also "more pixelated", than it would without this operation.

(129) The value of the variable ShademapMult is set to 0.40. The value of r is multiplied by 1. The value of r multiplied by 0.045 multiplied by the value of ShadeRed[x+Depth, y+DepthY] multiplied by the value of ShademapMult is added to this result. The final result of the operation is written to variable r. The value of g is multiplied by 1. The value of g multiplied by 0.040 multiplied by the value of ShadeGreen[x−Depth, y−DepthY] multiplied by the value of ShademapMult is subtracted from this result. The final result of the operation is written to variable g. The value of b is multiplied by 1. The value of b multiplied by 0.040 multiplied by the value of ShadeBlue[x−Depth, y−DepthY] multiplied by the value of ShademapMult is subtracted from this result. The final result of the operation is written to variable b.

(129) The value of r is multiplied by 1. The value of r multiplied by 0.045 multiplied by the value of ShadeRed[x+Depth, y+DepthY] multiplied by (the value of avg divided by 255) multiplied by the value of ShademapMult is added to this result. The final result of the operation is written to variable r. The value of g is multiplied by 1. The value of g multiplied by 0.040 multiplied by the value of ShadeGreen[x−Depth, y−DepthY] multiplied by (the value of avg divided by 255) multiplied by the value of ShademapMult is subtracted from this result. The final result of the operation is written to variable g. The value of b is multiplied by 1. The value of b multiplied by 0.040 multiplied by the value of ShadeBlue[x−Depth, y−DepthY] multiplied by (the value of avg divided by 255) multiplied by the value of ShademapMult is subtracted from this result. The final result of the operation is written to variable b.

(129) The value of r is multiplied by 1. The value of r multiplied by 0.045 multiplied by the value of ShadeRed[x+Depth, y+DepthY] multiplied by (1 minus (the value of avg divided by 255)) multiplied by the value of ShademapMult is subtracted from this result. The final result of the operation is written to variable r. The value of g is multiplied by 1. The value of g multiplied by 0.040 multiplied by the value of ShadeGreen[x−Depth, y−DepthY] multiplied by (1 minus (the value of avg divided by 255)) multiplied by the value of ShademapMult is added to this result. The final result of the operation is written to variable g. The value of b is multiplied by 1. The value of b multiplied by 0.040 multiplied by the value of ShadeBlue[x−Depth, y−DepthY] multiplied by (1 minus (the value of avg divided by 255)) multiplied by the value of ShademapMult is added to this result. The final result of the operation is written to variable b.

(129) The shademap related operations in this step result in a final 3D image that appears more "volumetric", more "3 dimensional", and also more "optically sharp", and somewhat more "pixelated".

(130) The value of r is multiplied by 1, and 0 is added to this multiple. The result of this operation is written to variable r. The value of g is multiplied by 0.8, and 0 is added to this multiple. The result of this operation is written to variable g.

The value of b is multiplied by 0.9, and 0 is added to this multiple. The result of this operation is written to variable b. These are luminance- and color-correction steps that help create a well lit image with accurate color reproduction when viewing through red-cyan lensed 3D glasses.

(130) The square of the value of DensogramRed[x+Depth, y+DepthY], multiplied by 0.001, is added to the value of r. Zero is added to this result. The result of this operation is written to variable r. The square of the value of DensogramGreen[x−Depth, y−DepthY], multiplied by 0.001, is added to the value of g. Zero is added to this result. The result of this operation is written to variable g. The square of the value of DensogramBlue[x−Depth, y−DepthY], multiplied by 0.001, is added to the value of b. Zero is added to this result. The result of this operation is written to variable b.

(130) Adding the square of the value of the densogram buffers DensogramRed, DensogramGreen and DensogramBlue, multiplied by 0.001, to the image data stored in variables r, g and b has 3 different effects. The first effect is that the final 3D image created appears more brightly lit than it would without this step. The second effect is that the final 3D image created is "anti-aliased" quite effectively by this step. The third effect is that in videos converted to 3D, "flickering" at pixel-level caused by agressive optical image sharpening is significantly reduced. In summary: the image looks more brightly lit, it is anti-aliased, and a lot of pixel-level image flickering that could occur due to boosted image sharpness does not occur when the image is in motion.

(131) If the value of variable r is greater than 255, the value of variable r is set to 255. If the value of variable r is smaller than 0, the value of variable r is set to 0. If the value of variable g is greater than 255, the value of variable g is set to 255. If the value of variable g is smaller than 0, the value of variable g is set to 0. If the value of variable b is greater than 255, the value of variable b is set to 255. If the value of variable b is smaller than 0, the value of variable b is set to 0.

(132) The value of variable PostShiftX is set to −4. The value of variable PostShiftY is set to −1. The higher these values are set, the more 3D depth the method produces. Now come scaling parameters xs, ys, xp and yp. These scaling parameters are used to scale the RGB image that will be written to VideoOut.Red, VideoOut.Green and VideoOut.Blue in the final step of the method.

(132) For the first scaling parameter, the value of variable Depth multiplied by 0.0003 is added to the value 0.9825. The value of variable x is multiplied by the result of this operation. The new result is converted to an integer, and this integer is written to variable xs. For the second scaling parameter, the value of variable DepthY multiplied by 0.0003 is added to the value 0.9985. The value of variable y is multiplied by the result of this operation. The new result is converted to an integer, and this integer is written to variable ys. For the third scaling parameter, the value of variable Depth multiplied by 0.0003 is subtracted from the value 0.9985. The value of variable x is multiplied by the result of this operation. The new result is converted to an integer, and this integer is written to variable xp. For the fourth scaling parameter, the value of variable DepthY multiplied by 0.0003 is subtracted from the value 0.9825. The value of variable y is multiplied by the result of this operation. The new result is converted to an integer, and this integer is written to variable yp.

(132) These scaling values contribute to creating a final 3D effect that has more "3D volume", "3D depth" and "Z-depth" than it would have if no scaling were applied.

(132) The value of variable r is converted to an integer. The value of this integer is written to VideoOut.Red at index position [xs−22−PostShiftX, ys−22−PostShiftY]. The value of variable g is converted to an integer. The value of this integer is written to VideoOut.Green at index position [xp−22+PostShiftX, yp−22+PostShiftY]. The value of variable b is converted to an integer. The value of this integer is written to VideoOut.Blue at index position [xp−22+PostShiftX, yp−22+PostShiftY].

(132) Technical note: At the point where the values of variables r, g and b are written to VideoOut.Red, VideoOut.Green and VideoOut.Blue, a horizontal and vertical position offset of −22 pixels is applied, instead of −25 pixels. This is because the scaling applied to the RGB image just before this operation has shrunk the size of said image by a few pixels, and caused it to no longer sit perfectly centered in the 3D output image created. Using a final offset value of −22 instead of −25 allows the method to center the slightly shrunken image properly again, placing the centerpoint of the viewed 3D image roughly where it would sit of no scaling was applied in step (132).

1) Some embodiments of the method presented perform "physically correct" or "optically correct" 2D-to-3D conversions. Transparent objects and reflections and refractions, for example, are handled correctly, just as they would be if they were shot in genuine stereoscopic 3D. An actor sitting inside a car, behind a tinted windscreen that also has environment reflections on it, for example, will convert to 3D correctly. The windscreen reflections in front of the actor will not accidentally"stick to the actor's face" in the Stereoscopic 3D version of the footage, as might happen with a less sophisticated 2D-to-3D method. The method presented also handles common optical phenomena like motionblur, depth of field, bokeh, lens distortion, lens flares, grain, fuzzy-edged semi-transparent objects (e.g. hair or fur), volumetrics (smoke, fire, fog, haze, clouds) or other optical phenomena and artifacts that can appear in still images or motion footage, correctly.

2) The method presented is a fully automatic 2D-to-3D Conversion method; No human operator or supervision, calibration or elaborate parameter setting is required to convert 2D content to 3D with this method. Very large sets of images and motion footage can be batch converted to Stereoscopic 3D in a fully automated fashion. Example: A large World War II image and motion footage archive containing 50,000 hours of motion footage and 250,000 photographs can be converted to 3D in an automated fashion, over a few months, on a number of desktop PCs set up to work in parallel, without requiring a human operator, stereographer or other 3D conversion-related professional to be present at all times. Only some "problem footage" with unusual lighting, sharpness or color characteristics will require manual parameter setting.

3) The method presented is designed to be a "minimalist" short, fast, low-complexity 3D conversion method Implemented as hardware, the manufacturing- and design-cost, and overall complexity of the hardware, is as low as possible. Used as a software algorithm, the method can run in realtime on a variety of GPUs, including less expensive entry- and mid-level GPUs, such as those commonly found in smartphones and tablet computers.

4) The method presented, when implemented as shown in this patent, is completely stable and reliable. During testing, the software prototype of the method presented was able to run for months without a single crash or other stability or reliability problems occurring.

5) The method presented is a top-to-bottom, left-to-right scanning "scanline" image- and video-processing method broken down into 9 Segments. Each of the 9 Segments that make up the method is completely parallelizable or multi-threadable—the digital image or video frame processed can be broken down into overlapping stripes or tiles, that then get processed by different CPU or GPU cores. This makes the method—as a software algorithm—highly suited to be run, in realtime, on parallel-processing based accelerator hardware like programmable GPUs (e.g. Nvidia Tegra), Co-Processor boards (e.g. Intel Xeon Phi), FPGAs and some SOCs ("System On Chip") used in Smart TVs and set-top boxes, that have a built-in GPU.

6) The method presented uses fast-executing floating point mathematics operations—such as add, subtract, multiply, divide—as much as possible. This increases the likelihood of entry- and mid-level GPUs being able to run the 2D-to-3D method at realtime speeds of 24 to 60 frames per second.

7) The method presented can use inexpensive cardboard Anaglyph 3D glasses that cost only a few cents a piece to facilitate 3D viewing. No expensive active shutter glasses or passive polarized 3D glasses are needed.

8) The method's Stereoscopic 3D output can be viewed on any colour screen or other output device that can display RGB colors and has a resolution of 400×300 pixels or better. This includes smartphones, tablet computers, laptop & desktop computer screens, regular 2D TVs (CRT, LCD, LED, Plasma), and others. The methods 3D output can also be projected onto a screen or wall using any regular colour projector. No expensive 3D screens or special 3D capable projectors are required to view the 3D footage generated by this method. In addition, the red-cyan Anaglyph 3D images created by the method can be printed to paper, with some recalibration, by a color printer or photocopier and viewed in 3D with red-cyan Anaglyph 3D glasses. This allows print-based uses like publishing a magazine with 3D images in it, or allowing a color photocopier to create "Stereo 3D" copies of 2D input material.

9) The method's red-cyan Anaglyph 3D video output is, technically speaking, no different from regular 2D RGB video. The 3D footage can be broadcast—analogue or digital TV broadcast—or streamed at SD and HD resolutions, to any color TV or other color display device, just like regular 2D footage. The methods Anaglyph 3D output can also be compressed using some regular 2D video codecs, and stored or distributed on physical media made for 2D footage, like DVDs and Bluray discs. The only difference from regular 2D footage is that the 3D footage created by the method presented is typically much sharper than the input footage. Thus a higher bitrate may be required when compressing the sharper-than-normal 3D image without loss of sharpness occurring during compression.

10) The method presented upgrades 2D video footage in 4 distinct respects. 1) The 2D footage is upgraded to Stereoscopic 3D. 2) The footage is digitally re-lit and contrast-adjusted for optimal viewing through passive red-cyan lensed 3D glasses. 3) The colors of the source footage are upgraded to more vibrant and lively colors. 4) The optical sharpness of the footage is increased by as much as 200%. The sharpness of footage is important in 3D conversion. The sharper the footage, the stronger the 3D effect tends to come across. Blurry footage, on the other hand, tends to lessen the 3D effect and immersiveness of viewing stereoscopic 3D material.

What is claimed is:

1. A method for converting at least one of 2 dimensional images and video frames to stereoscopic 3d, the method comprising:
   a) supplying at least one of 2 dimensional digital images and video frames to an imaging system, the system comprising:
      i) at least one of a central processing unit, a graphics processing unit, a co-processor, a fpga, an asic, and another processor capable of running the method in at least one of realtime and offline;
      ii) an output that provides at least one of stereoscopic 3d anaglyph images and video frames created by the method for at least one of storage, processing, compression, displaying, streaming, and broadcasting;
      iii) a plurality of 2 dimensional memory arrays that are configured to be used to store, access, and process at least one of an image, a shademap, a light densogram, a and a depthmap; and
      iv) a plurality of parallelizable nested loops that are configured to perform at least one of an image processing function and a mathematical operation;
   b) analyzing a shading of the at least one of the 2 dimensional images and the video frames being processed to create red, green, and blue shademaps;
   c) analyzing a light density of the at least one of the 2 dimensional images and the video frames being processed to create red, green, and blue light densograms;
   d) generating a depthmap used to convert the at least one of the 2 dimensional images and the video frames being processed to stereoscopic 3d;
   e) adjusting at least one of a brightness and a lighting of the at least one of the 2 dimensional images and the video frames being processed;
   f) adjusting a color of the at least one of the 2 dimensional images and the video frames being processed;
   g) increasing an optical sharpness of the at least one of the 2 dimensional images and the video frames being processed;
   h) using a square of the red, green, and blue light densograms generated to at least one of brighten the at least one of the 2 dimensional images and the video frames, anti alias the at least one of the 2 dimensional images and the video frames, and reduce sharpness-related flickering in motion video; and
   i) at least one of shifting, scaling, and deforming at least one of an input image and video frame at a pixel level to create synthetic left-eye, right-eye images, together comprising an anaglyph output image that is configured to appear as a stereoscopic 3D image.

2. A system for converting at least one of 2 dimensional images and video frames to stereoscopic 3d, the system comprising:
   a) an input configured to supply at least one of 2 dimensional digital images and video frames to the system;
   b) at least one of a central processing unit, a graphics processing unit, a co-processor, a fpga, an asic, and another processor capable of functioning with the system to convert the at least one of the 2 dimensional images and the video frames into stereoscopic 3d in at least one of realtime and offline;
   c) an output configured to provide at least one of stereoscopic 3d anaglyph images and video frames created by the system for at least one of storage, processing, compression, displaying, streaming, and broadcasting;
   d) a plurality of 2 dimensional memory arrays that are configured to store, access, and process at least one of an image, a shademap, a light densogram, and a depthmap;
   e) a plurality of parallelizable nested loops that are configured to perform at least one of an image processing function and a mathematical operation; and
   f) an image processing function that analyses shading of the at least one of the 2 dimensional images and the video frames being processed, creating red, green, and blue shademaps in the process;
   wherein the system is configured to perform:

i) an image processing function that analyses a light density of the at least one of the 2 dimensional digital images and the video frames being processed, to create red, green, and blue light densograms;

ii) a plurality of mathematical operations that generate a depthmap used to convert the at least one of the dimensional images and the video frames being processed to stereoscopic 3d;

iii) a plurality of mathematical operations that adjust at least one of a brightness and a lighting of the at least one of the 2 dimensional images and the video frames being processed;

iv) a plurality of mathematical operations that adjust a color of the at least one of the 2 dimensional images and the video frames being processed;

v) a plurality of image processing operations that increase an optical sharpness of the at least one of the 2 dimensional images and the video frames being processed;

vi) an image processing operation that uses a square of the red, green, and blue light densograms to brighten the at least one of the 2 dimensional images and the video frames, to anti alias the at least one of the 2 dimensional images and the video frames, and to reduce sharpness-related flickering in motion video; and vii) a plurality of mathematical operations that are configured to shift, scale, and deform at least one of an input image and video frame at a pixel level to create synthetic left-eye, right-eye images, together comprising an anaglyph output image that is configured to appear as a stereoscopic 3D image.

* * * * *

UNITED STATES PATENT AND TRADEMARK OFFICE
CERTIFICATE OF CORRECTION

PATENT NO. : 9,131,209 B1
APPLICATION NO. : 14/524964
DATED : September 8, 2015
INVENTOR(S) : Can Demirbag Page 1 of 1

It is certified that error appears in the above-identified patent and that said Letters Patent is hereby corrected as shown below:

In the specification
Column 2, lines 33-34, a space should be added between the words 'accurately' and '"alleviate"';
Column 2, lines 52-53, a space should be added between the words 'fully' and '"manual"'.
Column 3, line 1, a space should be added between the words 'category' and '"highly popular"';
Column 3, line 64, the words 'real world' should be replaced with --real-world--.
Column 4, line 3, the words 'real world' should be replaced with --real-world--.
Column 6, line 29 and 46, the words 'real world' should be replaced with --real-world--;
Column 6, line 60, the word 'Analgyph' should be replaced with --Anaglyph--.
Column 8, line 67, the word 'sportscar' should be replaced with the words --sports car--.
Column 9, line 16, the words 'real world' should be replaced with --real-world--.
Column 10, lines 23 and 25, the word 'skintones' should be replaced with the words --skin tones--;
Column 10, line 28, the word 'skintone' should be replaced with the words --skin tone--.
Column 17, line 4, the words 'well lit' should be replaced with --well-lit--;
Column 17, line 24, the word 'agressive' should be replaced with --aggressive--.
Column 18, lines 26-27, a space should be added between the words 'accidentally' and '"stick to the actor's face"'.
Column 19, line 14, the words 'a piece' should be replaced with --apiece--.

In the claims
Column 20, line 34, Claim 1, the words 'anti alias' should be replaced with --anti-alias--.

Signed and Sealed this
Twenty-sixth Day of April, 2016

Michelle K. Lee
*Director of the United States Patent and Trademark Office*